United States Patent
Shin et al.

(10) Patent No.: US 8,433,722 B2
(45) Date of Patent: Apr. 30, 2013

(54) OBJECT IDENTIFICATION SYSTEM, WIRELESS INTERNET SYSTEM HAVING THE SAME AND METHOD SERVICING A WIRELESS COMMUNICATION BASED ON AN OBJECT USING THE SAME

(75) Inventors: Eui-Hyun Shin, Gyeonggi-do (KR); Hyun-Jeong Choi, Seoul (KR); Sung-Yong Park, Seoul (KR)

(73) Assignee: Kiwiple Co., Ltd., Seoul (KR)

( * ) Notice: Subject to any disclaimer, the term of this patent is extended or adjusted under 35 U.S.C. 154(b) by 142 days.

(21) Appl. No.: 13/060,969

(22) PCT Filed: Aug. 26, 2009

(86) PCT No.: PCT/KR2009/004750
§ 371 (c)(1),
(2), (4) Date: Feb. 25, 2010

(87) PCT Pub. No.: WO2010/024584
PCT Pub. Date: Mar. 4, 2010

(65) Prior Publication Data
US 2011/0161365 A1    Jun. 30, 2011

(30) Foreign Application Priority Data

Aug. 27, 2008   (KR) ................. 10-2008-0083926
Aug. 27, 2008   (KR) ................. 10-2008-0083938

(51) Int. Cl.
*G06F 17/30*    (2006.01)
(52) U.S. Cl.
USPC ........... 707/769; 382/199; 382/218; 382/203; 345/633
(58) Field of Classification Search .............. 707/769; 382/199, 203, 218; 345/633; 701/409
See application file for complete search history.

(56) References Cited

U.S. PATENT DOCUMENTS 8,255,156 B2 *   8/2012   Ravenscroft et al. ......... 701/409
2004/0174434 A1    9/2004   Walker et al.
(Continued)

FOREIGN PATENT DOCUMENTS

EP    2280563 A1 *   2/2011
EP    2023532 B1 *   4/2011
(Continued)

OTHER PUBLICATIONS

Mobile Wireless Computing, Imielinski et al.*
(Continued)

*Primary Examiner* — Jean M Corrielus
(74) *Attorney, Agent, or Firm* — Daly, Crowley, Mofford & Durkee, LLP

(57) ABSTRACT

An objection identification system includes a virtual object database (DB) in which a plurality of virtual objects is stored and a target virtual object. The virtual objects includes an attribute data set including an attribute value of a real object and a service data set including a service data related to the real object. The target virtual object determining part receives a real object identification data of a target real object previewed by a terminal to compute an attribute value of the target real object, and determines a virtual object having an attribute value matched to an attribute value of the computed target real object of plural virtual objects stored in the virtual object DB as a target virtual object. In this case, a service data included in the service data set of the determined target virtual object by the target virtual object determining part is transmitted to the terminal. Thus, it may provide Internet type based on a real object over a conventional Internet concept handing a virtual object. In addition, easy and intuitive wireless Internet environment may be realized, and various Internet service and new higher value-added business may be created.

77 Claims, 12 Drawing Sheets

U.S. PATENT DOCUMENTS

| | | | | |
|---|---|---|---|---|
| 2009/0285491 | A1* | 11/2009 | Ravenscroft et al. | 382/203 |
| 2010/0185529 | A1* | 7/2010 | Chesnut et al. | 705/27 |
| 2012/0062595 | A1* | 3/2012 | Oh et al. | 345/633 |
| 2012/0176409 | A1* | 7/2012 | Noge | 345/633 |
| 2012/0294539 | A1* | 11/2012 | Lim et al. | 382/218 |
| 2012/0321199 | A1* | 12/2012 | Lim | 382/199 |

FOREIGN PATENT DOCUMENTS

| | | |
|---|---|---|
| JP | 2004/234465 | 8/2004 |
| JP | 2006/004095 | 1/2006 |
| KR | 2003/54603 | 7/2003 |
| KR | 2006/93951 | 8/2006 |
| KR | 0679864 | 7/2007 |
| KR | 2008/22850 | 3/2008 |
| WO | WO 2007/080473 | 7/2007 |

OTHER PUBLICATIONS

Choi et al., "Realization of an Outdoor Augmented Reality System Using GPS Tracking Method", 2002, Dept. of Electronics, Myongji University, Computer Virtual Reality Research, Computer & Software Laboratory, ETRI, 11 pages.

* cited by examiner

OBJECT IDENTIFICATION SYSTEM, WIRELESS INTERNET SYSTEM HAVING THE SAME AND METHOD SERVICING A WIRELESS COMMUNICATION BASED ON AN OBJECT USING THE SAME

PRIORITY STATEMENT

CROSS REFERENCE TO RELATED APPLICATION

The present application is a U.S. national stage application under 35 USC 371 of International Application No. PCT/KR2009/004750, filed on Aug. 26, 2009, which claims priority under 35 U.S.C. §119 to Korean Patent Application No. 10-2008-83938, filed on Aug. 27, 2008 and Korean Application No. 10-2008-83926, filed on Aug. 27, 2008, both filed in the Korean Intellectual Property Office (KIPO), the contents of which are herein incorporated by reference in their entirety.

BACKGROUND OF THE INVENTION

1. Field of the Invention

Example embodiments of the present invention relate to an object identification system, a wireless Internet system having the object identification system and a method of servicing a wireless communication based on an object using the object identification system. More particularly, example embodiments of the present invention relate to an object identification system which identifies a matter or an object viewed through a terminal to provide information related to the object or provide a wireless communication service program such as Internet Website related to the object, a wireless Internet system having the object identification system and a method of servicing a wireless communication based on an object using the object identification system.

2. Description of the Related Art

Generally, in order to access wired Internet Website or wireless Internet Website, a user may execute a client program of a personal computer or a mobile telephone terminal to input a Website's Uniform Resource Locator (URL) address on an address window, or to search the URL address to input the searched URL address on an address window. That is, when the URL address is inputted directly through an input device such as a keyboard, a touch pen, etc., or inputted by clicking a hyper-linked URL address shown by a searching program, a client program requests Webpage, image, sound, file, etc., to a corresponding sever and then receives and displays the Webpage, the image, the sound, the file, etc. Thus, by intermediating the URL address, a user may obtain information stored in the corresponding sever. That is, the URL address corresponding to information is important, so that a directory service, a searching service, etc., has been developed in order to effectively obtain the URL address.

However, in a wireless Internet environment, it is inconvenient to execute a client program such as Internet browser through an inputting of characters at a small-sized device such as a mobile telephone terminal.

In order to use a conventional search service, a basic data such as a keyword should be inputted thereto. When the basic data is not existed, in order to obtain information related to a strange location, a strange building, a strange shop, etc., a search for searching the basic data such as the strange location, the strange building, the strange shop, etc., should be performed. Thus, a searching time or a searching effort for obtaining related information or accessing a related Website is increased. Therefore, a utilization of Internet at a wireless Internet environment may be decreased in comparison with a wired Internet environment.

Moreover, a user who wishes to obtain information while walking by a mobile telephone terminal wants to intuitively and immediately access a Website related to a target or to execute a client program related to the target without a searching.

Thus, when a target object is intuitively selected, an object identification system is required, which identifies the selected object to access a website related to the identified target or executes an additional service program. Moreover, a wireless Internet service utilizing the object identification system is required.

SUMMARY OF THE INVENTION

Example embodiments of the present invention provide an object identification system which identifies an object intuitively selected by a terminal and is capable of obtaining information related to the object.

Example embodiments of the present invention also provide a wireless Internet system capable of providing a wireless communication service or contents related to an object when the object is intuitively selected by the above-mentioned object identification system.

Example embodiments of the present invention further also provide a method of an object-based wireless communication service capable of obtaining information related to an object by identifying an object intuitively selected by a terminal or of providing a wireless communication service or contents related to an object.

According to one aspect of the present invention, an object identification system includes a virtual object database (DB) in which plural virtual objects are stored and a target virtual object. The virtual objects include an attribute data set including an attribute value of a real object and a service data set including a service data related to the real object. The target virtual object determining part receives a real object identification data of a target real object previewed by a terminal to compute an attribute value of the target real object, and determines a virtual object having an attribute value matched to an attribute value of the computed target real object of plural virtual objects stored in the virtual object DB as a target virtual object. In this case, a service data included in the service data set of the determined target virtual object by the target virtual object determining part is transmitted to the terminal.

In an example embodiment, the real object identification data may include a position value of the terminal, a distance value between the target real object and the terminal, and an azimuth value of the target real object for measuring a direction for viewing the target real object through the terminal.

In an example embodiment, the position of the target real object may be fixed to comprise a position value of a real object corresponding to an attribute value of the virtual object. The target virtual object determining part may compute the position value of the target real object from the position value of the terminal, the distance value between the target real object and the terminal, and the azimuth value of the target real object to determine a virtual object having a position value matched to the position value of the target real object as an attribute value to be a target virtual object.

In an example embodiment, the target real object may be moved in a regular moving path to have a regular position value according to a time. An attribute value of the virtual object may include a moving path of a real object moved along a regular path and a position value according to a time. The target virtual object determining part may compute the position value of the target real object from the position value of the terminal, the distance value between the target real object and the terminal, and the azimuth value of the target real object to determine a virtual object having a position value matched to the position value of the computed target real object at a time when the target real object is previewed as an attribute value to be a target virtual object.

In an example embodiment, the target real object may be moved to have a regular moving path in which a regular position value according to a time is regular. The real object identification data may be a variation value according to a time of a position value of the terminal. The attribute value of the virtual object may include a moving path of a real object moved along a regular path and a position value according to a time. The target virtual object determining part may compute a position value according to a moving path and a time of the target real object from a variation value according to a time of a position value of the terminal to determine a virtual object having a position value according to a moving path and a time matched to the computed moving path and a time of virtual objects stored in the virtual object DB as an attribute value to be a target virtual object.

In an example embodiment, the target real object may be celestial bodies. The real object identification data may include a position value of the terminal, an azimuth value of the target real object and a height value of the celestial bodies. An attribute value of the virtual object may include a date, a time of a corresponding celestial bodies and a position value on a celestial sphere according to a position of a viewer. The target virtual object determining part may compute a position value on a celestial sphere of the previewed celestial bodies from a position value of the terminal, the azimuth value of the of the celestial bodies and the height value of the celestial bodies, to determine a virtual object having a position value on the celestial sphere matched to the computed position value on the celestial sphere at a time when the celestial bodies are is previewed as an attribute value to be a target virtual object. In this case, the real object identification data may further include a height value of the terminal. The target virtual object determining part may compute a position value on the previewed celestial sphere from the position of the terminal, the azimuth value of the celestial bodies, the height value of the celestial bodies and the height value of the terminal.

In an example embodiment, the target real object may be a matter to which a unique identification parameter storing identification information for identifying an object is attached. The real object identification data may include identification information of the target real object stored in the unique identification parameter. An attribute value of the virtual object may include identification information corresponding to the virtual object. The target virtual object determining part may determine a virtual object having identification information matched to identification information of the target real object transmitted from the terminal of plural virtual objects stored on the virtual object DB as an attribute value to be a target virtual object. In this case, the unique identification parameter may include a barcode or a radio frequency identification (RFID) tag. In this case, the real object identification data may further include a position value of the terminal. An attribute value of the virtual object may further include a position value of a corresponding real object. The target virtual object determining part may determine a virtual object having identification information and a position value that are respectively matched to identification information of the target real object and a position value of the terminal transmitted from the terminal of plural virtual objects stored on the virtual object DB as an attribute value to be a target virtual object.

In an example embodiment, the target real object may include a text or a symbol. The real object identification data may include text data that is the text converted thereto or image data that is the symbol converted thereto. An attribute value of the virtual object may include text data or image data of the real object corresponding to the attribute value of the virtual object. The target virtual object determining part may determine a virtual object having text data or image data that are respectively matched to the text data or the image data of the target real object transmitted from the terminal of plural virtual objects stored on the virtual object DB as an attribute value to be a target virtual object. The real object identification data may further include a position value of the terminal. An attribute value of the virtual object may further include a position value of a corresponding real object. The target virtual object determining part may determine a virtual object having image data and a position value that are respectively matched to the image data and the position value of the target real object transmitted from the terminal of plural virtual objects stored on the virtual object DB as an attribute value to be a target virtual object.

In an example embodiment, the target real object may be a target object terminal possessed by a previewed person. The real object identification data may be that a position value of a user terminal, a distance value between the user terminal and the target object terminal and an azimuth value of the target object terminal. An attribute value of the virtual object may be a position value of an object terminal corresponding to a time when the target object terminal is previewed. The target virtual object determining part may compute a position value of the target object terminal from the position value of the user terminal, the distance value between the user terminal and the target object terminal and the azimuth value of the target object terminal to determine a virtual object having a position value matched to a position value of the target object terminal as an attribute value into a target virtual object. In this case, the attribute value of the virtual object may further include terminal identification information of an object terminal. The user terminal and the target object terminal may use Bluetooth. The user terminal may correspond to a master terminal. The target object terminal may be included in at least one slave terminal. The master terminal may receive a slave terminal data set including terminal identification information and a position value of the slave terminal from at least one slave terminal to transmit the slave terminal data set to the target virtual object determining part. The target virtual object determining part may compare the computed position value of the target object terminal with a position value of the at least one slave terminal included in the slave terminal data set to obtain a slave terminal having a position value matched to the computed position value of the target object terminal, and may determine a virtual object having a terminal identification information matched to a terminal identification information included in a slave terminal data set of the obtained slave terminal as an attribute value to be a target virtual object.

In an example embodiment, the attribute value of the virtual object may include a relation object sharing the service data. A service data shared with the target virtual object of a service data included in a service data set of a relation object included in the determined attribute value of the target virtual object may be transmitted to the terminal.

In an example embodiment, a service data included in the service data set may be information service data related to the target real object. Information service data included in a service data set of the target virtual object determined by the target virtual object determining part may be displayed on the terminal.

In an example embodiment, a service data included in the service data set may be memo/bulletin service data related to the target real object. Memo/bulletin service data included in a service data set of the target virtual object determined by the target virtual object determining part may be displayed on the terminal. Memo/bulletin service data inputted by the terminal may be stored in a service data set of the target virtual object.

In an example embodiment, a service data included in the service data set may be text message/E-mail service data including a text message of an E-mail message for delivering to the target real object. The text message/E-mail service data including a text message of an E-mail message transmitted by the terminal may be stored in a service data set of a target virtual object determined by the target virtual object determining part.

In an example embodiment, a service data included in the service data set may be a Uniform Resource Locator (URL) of a Website related to the target real object. The URL included in a service data set of a target virtual object determined by the target virtual object determining part may be transmitted to the terminal, so that a Website related to the target real object is displayed on the terminal.

In an example embodiment, a service data included in the service data set may be a file attaching service data related to the target real object. An attaching file included in a service data set of a target virtual object determined by the target virtual object determining part may be transmitted to the terminal, or an attaching file attached by the terminal may be stored in a service data set of the target virtual object.

In an example embodiment, a service data included in the service data set may include a list of terminals accessed to the target real object or a list of terminals recently accessed to the target real object.

In an example embodiment, when a virtual object having an attribute value matching with an attribute value of the target real object is not existed, a new virtual object may be established to be stored in the virtual object DB. When a virtual object having an attribute value matching with an attribute value of the target real object is no less than two, a virtual object selected by the terminal may be determined as a target virtual object.

In an example embodiment, the virtual object may include a main virtual object and at least one sub-virtual object. The main virtual object and the sub-virtual object may respectively correspond to the same real object to have attribute values different from each other or service data different from each other.

According to another aspect of the present invention, a wireless Internet system includes a terminal and an object identification system. The terminal includes an image identification part for previewing a target real object to generate a real object identification data for identifying the previewed target real object. The object identification system receives a real object identification data generated by the terminal to compute an attribute value of the target real object, determines a virtual object having an attribute value matched to an attribute value of the computed target real object of plural virtual objects as a virtual object, and transmits a service data included in a service data set of the determined target virtual object to the terminal.

In an example embodiment, the object identification system may include a virtual object database (DB) and a target object determining part. The virtual object DB may store plural virtual objects including an attribute data set including an attribute value of a real object and a service data set including a service data related to the real object. The target object determining part may receive a real object identification data generated by the terminal to compute an attribute value of the target real object, and may determine a virtual object having an attribute value matched to an attribute value of the computed target real object of the plural virtual objects stored in the virtual object DB as a virtual object.

In an example embodiment, the real object identification data may include a position value of a terminal, a distance value between a target real object previewed by the terminal and an azimuth value of the target real object for measuring a direction for viewing the target real object through the terminal.

In an example embodiment, the terminal may include a position measuring part generating a position value of the terminal. The position measuring part of the terminal may include a global positioning system (GPS) receiver to generate the position value of the terminal by using a GPS. Alternatively, the position measuring part of the terminal may measure a distance between an access point (AP) at an inner room or an outer room and the terminal to generate the position value of the terminal.

In an example embodiment, the terminal may include a distance measuring part generating a distance value between the terminal and the target real object. The distance measuring part of the terminal may measure a distance value between the previewed target real object and the terminal by using a distance measuring system included on an auto-focus device of the image identification part. The terminal may include a zoom adjusting part which adjusts a distance value between the terminal and the target real object.

In an example embodiment, the terminal may include a direction measuring part generating an azimuth value of the target real object. In this case, the direction measuring part may include a geomagnetic sensor which checks a flow of a magnetic field generated from the earth to detect a direction of a terminal to generate an azimuth value of the target real object. The real object identification data may further include a height value of the target real object, and the direction measuring part may further include an acceleration sensor which measures a slope angle of the terminal with respect to an acceleration of a gravity to generate a height value of the target real object. Alternatively, the direction measuring part may include a motion sensor in which a geomagnetic sensor and a motion sensor are integrated. The geomagnetic sensor may check a flow of a magnetic field generated from the earth to detect a direction of a terminal, and the acceleration sensor may measure a slope angle of the terminal with respect to an acceleration of a gravity to generate a height value of the target real object.

In an example embodiment, the real object identification data may include identification information of the target real object stored in a unique identification parameter storing identification information for identifying an object, and the terminal may include a unique identification parameter identification part which identifies a unique identification parameter storing identification information of the target real object. In this case, the unique identification parameter may be a radio frequency identification (RFID) tag. The unique identification parameter identification part may include a RFID reader which identifies identification information of the target real object stored in the RFID tag.

In an example embodiment, the real object identification data may include text data or image data. An image identification part of the terminal may identify an image of a target real object to generate the image data or the text data.

In an example embodiment, the target real object may be a target object terminal possessed by a previewed person. The terminal and the target object terminal may use Bluetooth. The user terminal may correspond to a master terminal. The target object terminal may be included in at least one slave terminal. The master terminal may receive a slave terminal data set including terminal identification information and a position value of the slave terminal from at least one slave terminal to transmit the slave terminal data set to the target virtual object determining part.

According to still another aspect of the present invention, there is provided a method of an object-based wireless communication service. In the method, a real object identification data for identifying a target real object previewed by a terminal is generated. The generated real object identification data is transmitted to an object identification system storing plural virtual objects including an attribute value of a real object and a service data related to the real object. The real object identification data is received to compute an attribute value of the target real object, and a virtual object having an attribute value matched to the computed attribute value of the target real object of the plural virtual objects is obtained to determine a target virtual object corresponding to the target real object. A service data of the determined target virtual object is transmitted to the terminal to provide the terminal with a service data related to the target real object.

In an example embodiment, a kind of a target real object may be selected through the terminal. The kind of the target real object may include a real object of which a position is fixed, a real object of which a moving path according to time is regular, a real object of which a unique identification parameter storing identification information for identifying an object is attached, a real object including a text or a symbol, and a person having the object terminal.

In an example embodiment, when a virtual object having an attribute value matched to an attribute value of the target real object is not existed, a new virtual object may be established to be stored in the object identification system. When the new virtual object is established to be stored in the object identification system, it may be determined whether a virtual object is established through the terminal or not. Alternatively, when the new virtual object is established to be stored in the object identification system, a service data related to the established virtual object may be inputted through the terminal and the inputted service data may be stored to the object identification system.

In an example embodiment, when a virtual object having an attribute value matching with an attribute value of the target real object is no less than two, a virtual object selected by the terminal may be determined as a target virtual object.

In an example embodiment, the virtual object may include a main virtual object and at least one sub-virtual object. The main virtual object and the sub-virtual object may respectively correspond to the same real object to have attribute values different from each other or service data different from each other. In this case, a sub-virtual object which corresponds to the target real object may be established to include at least one an attribute value of the determined target virtual object, an attribute value different from a service data and a service data. Moreover, a service data related to the sub-virtual object established through the terminal may be inputted.

In an example embodiment, the attribute value of the virtual object may include a relation object sharing the service data. When a service data related to the target real object is transmitted to the terminal, a service data shared with the target virtual object of a service data of a relation object included in an attribute value of the target virtual object may be transmitted to the terminal.

In an example embodiment, information service data related to the target virtual object may be displayed on the terminal. Moreover, information service data related to the target virtual object may be further inputted to transmit the inputted information service data to the object identification system, and the transmitted information service data may be further stored to a service data of the target virtual object.

In an example embodiment, memo/bulletin service data related to the target real object may be further inputted to transmit the inputted memo/bulletin service data to the object identification system, and then the transmitted memo/bulletin service data may be further stored to a service data of the target virtual object. In this case, a public condition of the memo/bulletin service data may be limited thereto, by including at least one of reading the memo/bulletin service data, weather, a range of a receiver and a range of public contents. Moreover, memo/bulletin service data related to the target virtual object may be displayed on the terminal.

In an example embodiment, text message/E-mail service data including a text message or an electronic mail for delivering the target real object may be transmitted to the object identification system, and then the text message/E-mail service data may be stored in a service data of the target virtual object.

In an example embodiment, text message or E-mail message included in the target virtual object may be transmitted to the terminal. In an example embodiment, a Uniform Resource Locator (URL) of a Website related to the target real object may be transmitted to the terminal to display the Website related to the target real object on the terminal. Moreover, a URL of a Website related to the target virtual object may be inputted through the terminal to transmit the inputted URL to the object identification system, and then the transmitted URL may be stored to a service data of the target virtual object.

In an example embodiment, an attaching file for attaching to the target real object may be transmitted to the object identification system through the terminal, and then the attaching file transmitted from the terminal may be stored in a service data of the target virtual object. An attaching file included in the target virtual object may be transmitted to the terminal.

In an example embodiment, at least one a list of terminals accessed to the target real object and a list of terminals recently accessed to the target real object may be provided to the terminal.

In an example embodiment, when the target real object having a fixed position value is previewed, a virtual object having a position value matched to a position value of the target real object of the virtual objects as an attribute value may be determined to be the target virtual object. In this case, in order to generate the real object identification data, a position value of the terminal, a distance value between the target real object and the terminal, and an azimuth value of the target real object for measuring a direction for viewing the target real object through the terminal are generated, and a position value of the target real object may be computed from the position value of the terminal, the distance value between the target real object and the terminal and the azimuth value of the target real object.

In an example embodiment, when a target real object moved in a regular moving path to have a regular position value according to a time is previewed, in order to determine the target virtual object, a virtual object having a position value matched to a position value of the target real object at a time when the target real object is previewed as an attribute value may be determined to be the target virtual object. In this case, a position value of the terminal, a distance value between the target real object and the terminal, and an azimuth value of the target real object for measuring a direction for viewing the target real object through the terminal may be generated, and a position value of the target real object corresponding to a time when the target real object is previewed may be computed from the position value of the terminal, the distance value between the target real object and the terminal and the azimuth value of the target real object.

In an example embodiment, when a target real object moved in a regular moving path to have a regular position value according to a time is previewed, a variation value according to a time of a position value of the terminal may be generated. When the target virtual object is generated, a position value according to a moving path of the target real object and a time may be computed from the variation value, and a virtual object having a position value according to a moving path and a time matched to the computed position value according to the computed moving path and the computed time of the virtual objects as an attribute value may be determined to be a target virtual object.

In an example embodiment, when celestial bodies are previewed, a virtual object having a position value on a celestial sphere matched to a position value on a celestial sphere of the celestial bodies at a date and a time when the celestial bodies are previewed of virtual objects as an attribute value may be determined to be a target virtual object. In this case, in order to generate the real object identification data, a position value of the terminal, an azimuth value of the target real object and a height value of the celestial bodies may be generated. When the target virtual object is generated, a position value on a celestial sphere of the celestial bodies at a date and a time when the celestial bodies are previewed may be computed from the position value of the terminal, the azimuth value of the target real object and the height value of the celestial bodies. Moreover, in order to generate the real object identification data, a height of the terminal may be measured. When the position value on the celestial sphere of the celestial bodies is computed, a position value on a previewed celestial sphere of the celestial bodies may be computed from the position value of the terminal, the azimuth value of the celestial bodies and the measured height value of the terminal.

In an example embodiment, when an object in which a unique identification parameter storing identification information for identifying an object is attached is previewed, in order to generate the real object identification data, the identification information of the target real object stored at the unique identification parameter may be sensed. In order to determine the target virtual object, a virtual object having identification information matched to identification information of the target real object transmitted from the terminal of the virtual objects as an attribute value may be determined to be a target virtual object. In this case, in order to generate a position value of the terminal, a position value of the terminal may be generated. A virtual object having identification information and a position value that are respectively matched to identification information of the target real object and a position value of the terminal that are transmitted from the terminal of the virtual objects as an attribute value may be determined to be a target virtual object.

In an example embodiment, when a text or a symbol is previewed, in order to generate the real object identification data, the text or the symbol may be converted into text data or image data, respectively, and a virtual object having text data or image data that is respectively matched to text data or image data of the target real object transmitted from the terminal of the virtual objects as an attribute value may be determined to be a target virtual object. In this case, in order to generate the target virtual object, a virtual object having image data and a position value that are respectively matched to image data and position value of the target real object transmitted from the terminal of the virtual objects as an attribute value may be determined to be a target virtual object.

In an example embodiment, when a person having a target object terminal is previewed, a position value of the target object terminal at a time when the target object terminal is previewed may be computed, and a virtual object having a position value matched to a position value of the target object terminal at a time when the target object terminal is previewed among the virtual objects as an attribute value may be determined to be a target virtual object. In this case, in order to generate the real object identification data, a position value of a user terminal; a distance value between the user terminal and the target object terminal and an azimuth value of the target object terminal may be generated, and a position value of the target object terminal at a time when the target object terminal is previewed may be computed from the position value of the user terminal, the distance value between the user terminal and the target object terminal and the azimuth value of the target object terminal. Moreover, the user terminal and the target object terminal may use Bluetooth, and the target object terminal may be included in at least one slave terminal. In order to generate the real object identification data, a slave terminal data set including terminal identification information and a position value of the slave terminal may be received from the slave terminal, the slave terminal data set may be transmitted to the object identification system, the computed position value of the target object terminal may be compared with a position value of the at least one slave terminal included in the slave terminal data set to obtain a slave terminal having a position value matched to the computed position value of the target object terminal, and a virtual object having a terminal identification information matched to a terminal identification information included in a slave terminal data set of the obtained slave terminal as an attribute value may be determined to be a target virtual object.

In an example embodiment, in order to generate the real object identification data, a distance value between the target real object and the terminal may be set through the terminal.

According to some example embodiments of the present invention, a real object is identified based on data generated by utilizing an identifying device of a terminal, so that it may provide Internet service based on a real object over a conventional Internet handling only a virtual object.

Moreover, it may easily provide Internet service by only previewing an object through an image identification part of a terminal without additional inputting to obtain information viewed by a user's eye, so that easy and intuitive wireless Internet environment may be realized.

Furthermore, a utilization of wireless Internet may be increased through the above wireless Internet service, and various Internet services and a new higher value-added business may be created.

BRIEF DESCRIPTION OF THE DRAWINGS

The above and other features and advantages of the present invention will become more apparent by describing in detailed example embodiments thereof with reference to the accompanying drawings, in which.

DETAILED DESCRIPTION OF THE INVENTION

Figure 1:
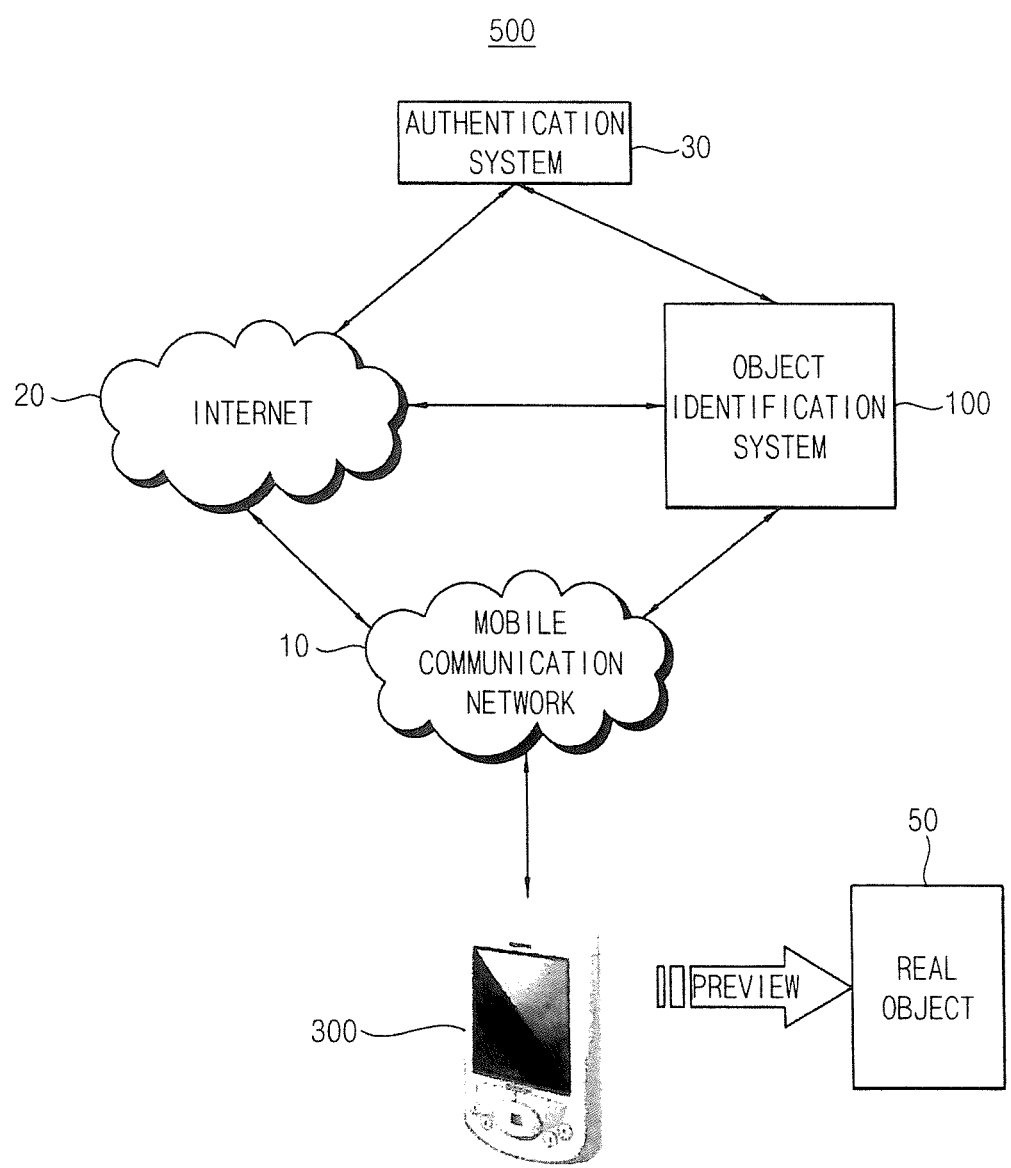
FIG. 1 is a concept diagram explaining a wireless Internet system in accordance with an exemplary embodiment of the present invention.

Hereinafter, the present invention will be explained in detail with reference to the accompanying drawings. The present invention is described more fully hereinafter with reference to the accompanying drawings, in which example embodiments of the present invention are shown. The present invention may, however, be embodied in many different forms and should not be construed as limited to the example embodiments set forth herein. Rather, these example embodiments are provided so that this disclosure will be thorough and complete, and will fully convey the scope of the present invention to those skilled in the art. In the drawings, the sizes and relative sizes of layers and regions may be exaggerated for clarity.

Figure 2:
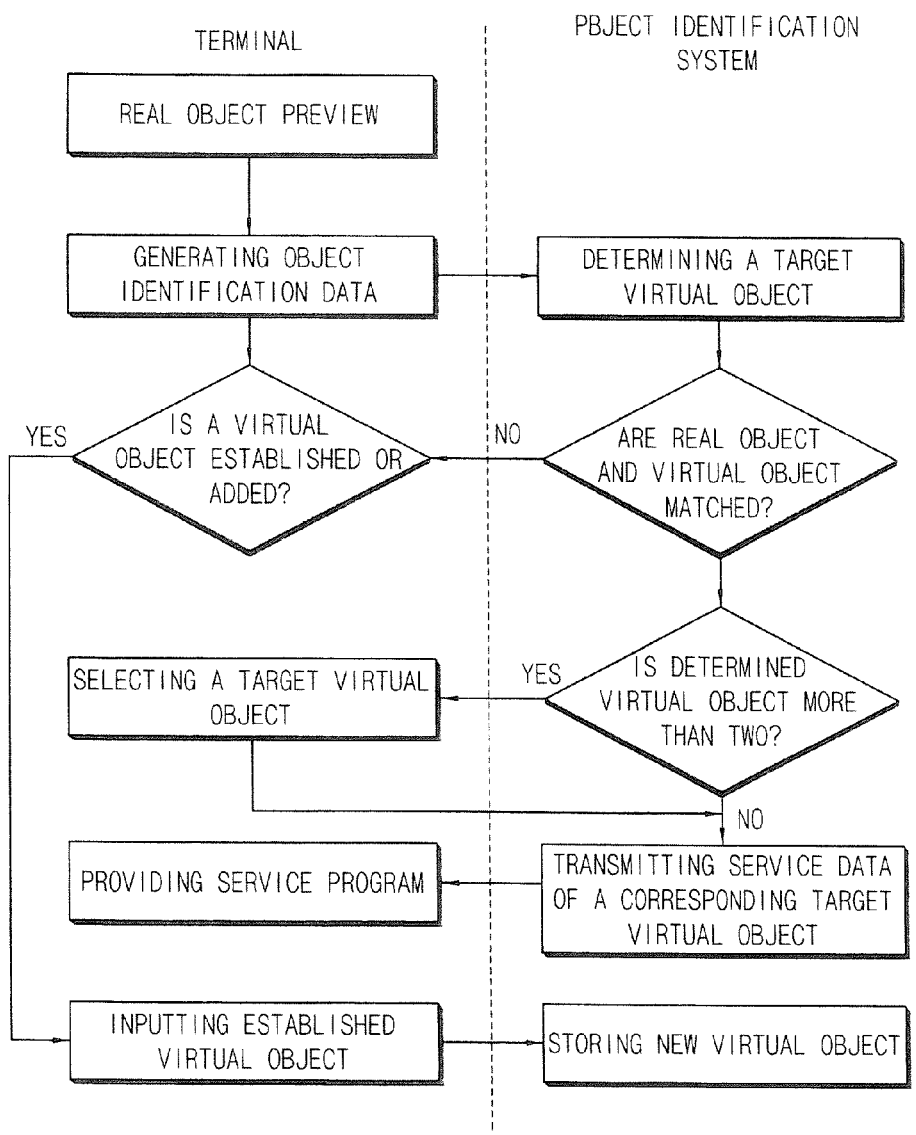
FIG. 2 is a flowchart showing operations performed by a terminal and an objection identification system shown in FIG. 1.

FIG. 1 is a concept diagram explaining a wireless Internet system in accordance with an exemplary embodiment of the present invention. FIG. 2 is a flowchart showing operations performed by a terminal and an object identification system shown in FIG. 1.

Hereinafter, terms used in the present specification will be defined.

A term "user" means a person using an Internet system according to the present invention, that is, a person possessing or carrying a terminal. The present invention is suitable to a mobile Internet. Alternatively, the present invention may be used to a wired Internet and the mobile Internet.

A term "preview" means that the user views an object or a target through a screen of a terminal.

A term "object" means all matters or all events capable of being identified by a user. For example, the term "object" is used as a concept including a matter such as buildings or trees of which positions are fixed, a place of a predetermined position, a matter such as vehicles of which a moving path is regular, a nature matter such as the sun, the moon and the star of which a moving path according to a time is regular, industrial products having a unique number or unique mark, designs such a predetermined text, mark, trademark, a person, an event or culture performances generated at a predetermined time, etc.

The object is classified into a real object called as a target existed in a real world and a virtual object which is stored and processed by the object identification system in accordance with the real object. That is, the virtual object corresponds to a virtual world object storing attribute values of a corresponding real object as a database.

It is not necessary that a virtual object corresponding to one real object is one. That is, corresponding real objects are identical to each other; however, plural virtual objects having the different attribute values or the different service data corresponding to each virtual object may be set. When one real object corresponds to plural virtual objects, a virtual object having the highest priority is defined as "a main virtual object" and the remaining virtual objects are defined as "a sub-virtual object." That is, a virtual object corresponding to one real object may be existed, and the plural virtual objects may be classified into a main virtual object and a sub-virtual object.

A term "target real object" means a real object among real objects, which is viewed through a terminal. For example, when a real object is previewed through the terminal having a camera and a display and a user requests information or service related to a corresponding real object, the previewed real object corresponds to a target real object.

A term "target virtual object" means a virtual object corresponding to the target real object. For example, when the terminal transmits data related to a target real object that is previewed through a terminal to an object identification system and requests information or service for the target real object, the object identification system processes the transmitted data to compare the processed data with a virtual object stored in the object identification system to obtain a virtual object corresponding to the target real object of the plural virtual objects. Thus, a virtual object, which is determined to correspond to the target real object by the object identification system, corresponds to a target virtual object.

A term "an attribute value of a real object matches with an attribute value of a virtual object" means that the attribute value of a real object and the attribute value of a virtual object are the same as each other or are same within an error range. For example, a term "a position value of a real object matches with a position of a virtual object" means that the two position values are the same as each other or substantially the same as each other.

A term "unique identification parameter" means a medium such as a barcode, a radio frequency identification tag, etc., which includes a predetermined information for easily identifying matters or industrial products.

Referring to FIGS. 1 and 2, a wireless Internet system 500 according to an exemplary embodiment includes a terminal 300 and an object identification system 100. The terminal 300 previews a real object 50. The object identification system 100 receives a real object identification data related to a real object from the terminal 300 to identify the real object 50 by processing the real object identification data. Then, the object identification system 100 transmits a service related to the identified real object to the terminal 300.

The wireless Internet system 500 according to the present exemplary embodiment my be connected to a mobile communication network 10 and an Internet network 20 in order to realize a wireless Internet environment or a mobile Internet environment. Technologies related to the mobile communication network 10 and an Internet are well known in the art, and thus detailed descriptions thereof will be omitted. Moreover, the wireless Internet system 500 may further include an authentication system 30 for checking whether or not a user is registered to a wireless Internet service.

A concept of the wireless Internet system 500 will be explained later. When a terminal 300 receives a command for a recognition work of a target real object in a state that a real object 50 is previewed, the terminal 300 generates a real object identification data for identifying the target real object to transmit the real object identification data to the object identification system 100. The object identification system 100 identifies an object-based on the real object identification data to transmit a service program to the terminal 300. The terminal 300 displays a Website related to an identified real object 500 or execute a service program related to the real object 50.

In this case, the real object identification data means basis data for identifying a real object, for example, a position value of a real object 50, an image, a unique identification parameter such as a barcode, etc. When an object is a text or a simple trademark, a pattern which is capable of being identified through a current text identifying technology or an image identifying technology, the text or the image itself identified through a terminal may be a real object identification data. Moreover, when an object is a matter such as industrial parameter having a unique identification parameter capable of near field communicating ("NFC") such as a barcode, a product number, a radio frequency identification (RFID) tag, etc., data having the unique identification parameter may be a real object identification data.

However, an object, which has a unique identification parameter such as texts, patterns, a barcode, RFID tag, etc., may be limited to a matter such as industrial products described above, and may be not adapted to various real objects of a real world such as a building, a place, a natural object, etc. Thus, a real object identification data used to an object identification system 100 according to an exemplary embodiment of the present invention includes data capable of computing a position value of an object such as a building, a place, a natural object, etc. For example, the real object identification data may include a position value of a terminal 300, a distance value between the terminal 300 and a real object 50, an azimuth value between the terminal 300 and the real object 50, etc. A method of generating real object identification data by the terminal 300 or a method of identifying an object by using the real object identification data will be described in various exemplary embodiments in detail.

When a real object identification data of a target real object previewed by a terminal 300, the object identification system 100 computes an attribute value of the target real object. For example, a position value of a target real object may be computed from a position value of a terminal 300, a distance value between the terminal 300 and a real object 50, and an azimuth value of the real object based on the north. The object identification system 100 compares an attribute value of a target real object such as the position value of the computed target real object, an image of the target real object, an identification information stored in an unique identification parameter, etc., with attribute values of virtual objects stored in a virtual object DB of the object identification system 100, and then determines a virtual object of which the attribute values are matched to each other as a target virtual object.

In an exemplary embodiment, when a virtual object having an attribute value matched with an attribute value of the target real object is not existed, a new virtual object may be established to be stored in the virtual object DB. Alternatively, a user may determine whether a virtual object is established through the terminal 300 or not, and may input a service data related to the established virtual object. For example, when a virtual object having a position value corresponding to the target real object is not stored in the virtual object DB, a virtual object having the computed position value as an attribute value may be established. The virtual object may be automatically established by the object identification system 100. Alternatively, the virtual object may be established in response to a requesting of the user.

When the numbers of the virtual objects having an attribute value that is matched with an attribute value of the target real object are equal to or more than two, the user may finally select a wanted target virtual object. When the numbers of the real objects previewed by the terminal 300 are equal to or more than two, the user selects the real object as a target real object to proceed a following process.

When the target virtual object is determined by the object identification system 100 or by a selection of the user, the object identification system 100 transmits a service data of the target virtual object to the terminal 300. The service data may include, for example, a general information providing service of a name, a definition, a history, etc., of the target real object, a bulletin service such as a memo, a scribble, a usage assessment, etc., a transmitting service of a text message or an E-mail message, an Internet access service, a file attaching service S5, etc.

In an exemplary embodiment, the number of virtual object corresponding to one real object may be plural. It is not necessary that a virtual object corresponding to one real object is one. That is, corresponding real objects are identical to each other; however, plural virtual objects having the different attribute values or the different service data corresponding to each virtual object may be set. For example, when a predetermined building is a real object, a position value of the building is one so that an identified real object is one. However, contents of a service related to the real object do not have to be the same, so that a second virtual object, a third virtual object, etc., which correspond to the building may be established in accordance with a user's need.

In this case, when one real object corresponds to plural virtual objects, a virtual object having the highest priority is defined as "a main virtual object" and the remaining virtual objects are defined as "a sub-virtual object." That is, a virtual object corresponding to one real object may be existed, and the plural virtual objects may be classified into a main virtual object and a sub-virtual object.

Thus, in accordance with sex or age, etc., of a user previewing the building or a service usage authority range of the user, a service provided to the user corresponding to the building may be established to be different to each other. In addition, a service data corresponding to characteristics of the user may be provided. In this case, the main virtual object capable of being easily accessed by an unspecified person is provided to a manager or the user having the priority, so that a service data which is differentiated from another sub-virtual object such as an advertisement service may be provided.

Moreover, when the sub-virtual object is used, a new sub-virtual object may be established and registered by a requesting of a user although a main virtual object or a sub-virtual object corresponding to the building is registered to an object identification system 100. That is, the user may establish a sub-virtual object corresponding to the target real object, which has at least one of an attribute value of the determined target virtual object, an attribute value different from a service data and the service data. Moreover, the user may input a service data related to an established sub-virtual object through the terminal. Thus, the user who individually utilizes a virtual object may secure a sub-virtual object, so that a utilization of the virtual object may be increased.

A user may immediately receive a service related to a real object 50 by previewing a real object 50 through a terminal 300. For example, when a user previews a specific building through a terminal 300 and commands a related Website access, an object identification 100 computes and determines a virtual object corresponding to the previewed real object to transmit a URL address of a related Website stored in the object identification system 100 to the terminal 300. The terminal 300 may immediately access a Website related to the previewed real object by using the transmitted URL address. Thus, it is possible to intuitively and immediately access a Website related to an object or to execute a service related to an object without a search by inputting an address or a basic data such as a keyword.

Figure 3:
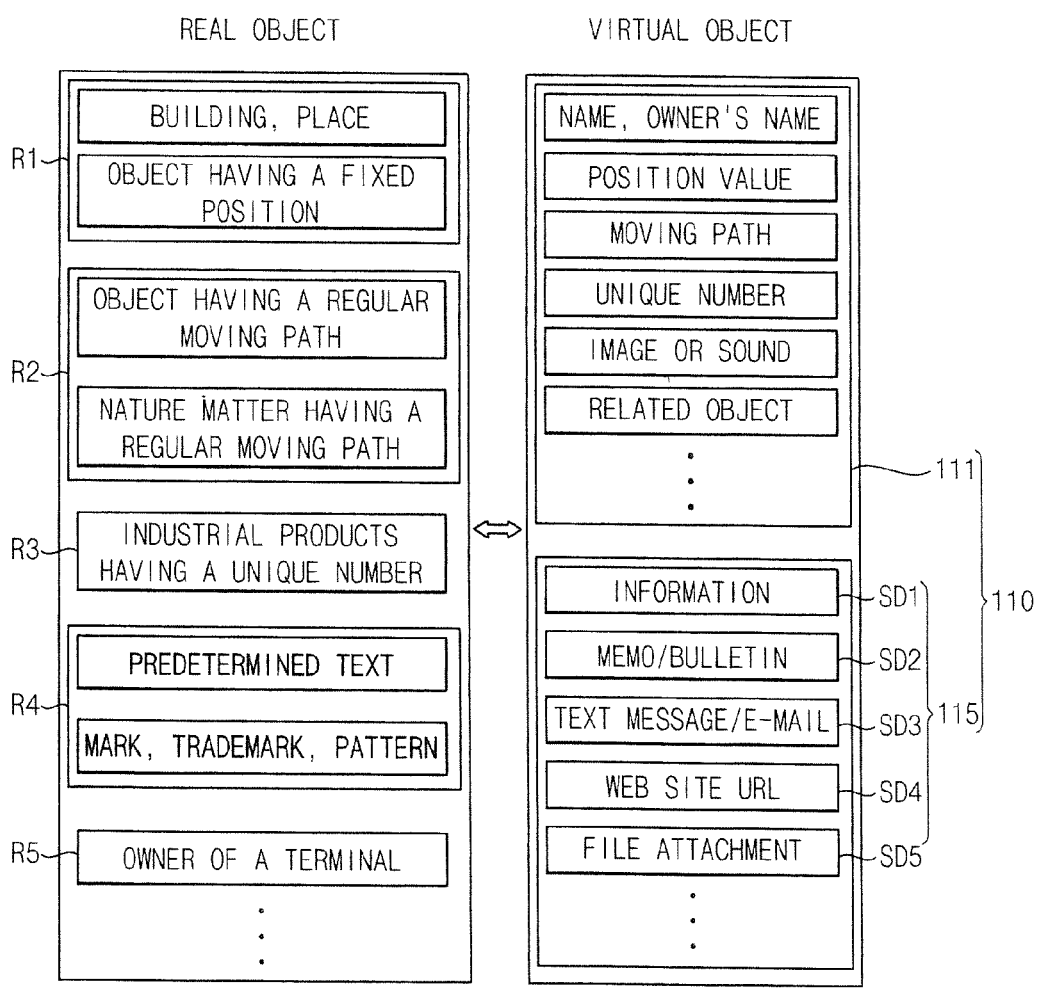
FIG. 3 is a block diagram explaining a concept of a virtual object and a real object that are used in the objection identification system shown in FIG. 1.

FIG. 3 is a block diagram explaining a concept of a virtual object and a real object that are used in the object identification system shown in FIG. 1.

Referring to FIGS. 1 and 3, an object identification system 100 according to an exemplary embodiment of the present invention includes a plurality of virtual objects 110.

Each of the virtual objects 110 includes an attribute data set 111 including an attribute value of the real object 50 and a service data set 115 including a service data related to the real object 50.

As described above, the real object 50 includes a matter of which a position is fixed such as a building, a tree, a rock, a specific place such as squares or a historic site, a matter of which a moving path is regular such as traffic means, a natural matter of which a moving path according to a time is regular such as celestial bodies, industrial products having a unique number or a unique mark, a pattern such as a predetermined text, a sign, a trademark, person such as an owner of a terminal having a unique mark, etc.

In an exemplary embodiment of the present invention, the real object 50 may be classified into five kinds R1, R2, R3, R4 and R5. A first classification R1 includes a specific place such as buildings, streets, shops, squares, a historic site, etc., and a real object of which a position is fixed such as trees, a monument, a statue, etc. A second classification R2 includes traffic means such as bus, train, etc., and real objects of which a moving path according to a time is regular such as the sun, the moon, etc. A third classification R3 includes industrial products or object of which a unique identification parameter such as a near field communicating identifying means such as a barcode, a product number, an RFID tag, etc., is attached thereto. A fourth classification R4 includes text such as a title of book or cinema, a trademark of products, a sign or a pattern such as an emblem of a sport team or car. A fifth classification R5 includes a terminal owner possessing a terminal capable of identifying as an object identification system according to the present invention.

The attribute data set 111 of the virtual object 110 includes attribute values of a real object 50. Here, the attribute value of the real object 50 denotes unique characteristics of a real object 50 such as a name, a position value, a moving path, a unique mark, an image, etc., which corresponds to the virtual object 110. The attribute values of the real object 50 are used as a data for identifying a real object by an object identification system 100 when a target virtual object corresponding to a target real object is obtained. A method of identifying a real object by the object identification system 100 will be explained in detail later.

The attribute value may be classified into an essential attribute value that is a unique value when an object is existed and an additional attribute value playing a role of making up for the essential attribute. The essential attribute value may be not varied, and the additional attribute value may be varied. For example, in an attribute value of a real object 50 belonged to the first classification R1, a position value of the real object 50 may be the essential attribute value, and a name, an owner, an image, etc., of the real object 50 may be the additional attribute value. In an attribute value of a real object 50 belonged to the second classification R2, a position value in accordance with a moving path or a moving time may be an essential attribute value, and a name, a running number, a running interval, an image, etc., of the real object 50 belonged to the second classification R2 may be an additional attribute value. Since a real object 50 belonged to the third classification R3 is an industrial product having a unique identification parameter such as a barcode, a product number and an RFID tag, an attribute value of the real object 50 belonged to the third classification R3 may have an identification information stored in a unique identifying parameter (which is so called as "a product ID") identified as the barcode, the product number and the RFID tag as an essential attribute value. An essential attribute value of a real object 50 which belongs to the fourth classification R4 may be an image such as text, a symbol, a pattern, etc. An attribute value of a real object 50 which belongs to the fifth classification R5 may have a position value of a terminal, a phone number of the terminal, a personal identification number (PIN) of the terminal as an essential attribute value, etc.

A service data set 115 of the virtual object 110 includes data related to a service which is provided to the terminal 300 by the object identification system 100. For example, when the terminal 300 selects a service kind related to a previewed target real object, the object identification system 100 determines a target virtual object corresponding to the target real object, and provides the terminal 300 with a service selected by the terminal 300 among services stored in the service data set 115 of the determined target virtual object.

In an exemplary embodiment, the service data set 115 may include information service data SD1, memo/bulletin service data SD2, text message/E-mail service data SD3, Internet connection service data SD4 and file attaching service data SD5.

Information service data SD1 may include text information such as a name, a definition, a history and a background of a corresponding real object 50 and multimedia information such as an image, a sound of a corresponding real object 50. Moreover, the text information and the multimedia information may be attribute value of the real object 50 included in attribute data set 111. For example, when a user previews a predetermined building through the terminal 300 and commands a providing of information related to the building, the object identification system 100 determines a target virtual object corresponding to the previewed building (i.e., a target real object) of virtual object 110 to provide the terminal 300 with information service data SD1 of the service data set 115 of the target virtual object. Thus, information related to the previewed building is displayed on a screen of the terminal 300. The information providing service may be performed by providing data stored in the object identification system 100 to the terminal 300. Alternatively, the information providing service may be performed by accessing Internet to receive information.

A memo/bulletin service data SD2 includes text information posted by users, which is related to a corresponding real object 50. For example, when the user previews a specific store through the terminal 300 and commands a providing of the memo/bulletin service related to the store, the object identification system 100 determines a target virtual object corresponding to the previewed store (i.e., a target real object) of a virtual object 110 to provide the terminal 300 with a memo/bulletin service data SD2 of a service data set 115 of the target virtual object. Thus, a memo/bulletin data related to the previewed store is displayed on the terminal 300. In addition, the user posts up an appraisal related to the previewed store or a visiting list through the terminal 300. Alternatively, the user leaves a memo which will be delivered to a predetermined person through the terminal 300. When an object is an industrial product, the user may leave a product evaluation or memo such as a celebration message attached to a gift.

In an exemplary embodiment, a user may limit a public condition such as a time for capable of reading a notice, weather, a range of a receiver, a range of public contents, etc. In another exemplary embodiment, a user may select a space range such as a specific position of an object such as a front gate of a target store, a sign of the target store, etc. The memo/bulletin service may be performed by providing data stored in the object identification system 100 to the terminal 300 without accessing Internet. Alternatively, the information providing service may be performed by accessing Internet to share memo/bulletin data in order to provide a service by organic coupling with a wired Internet.

A text message/E-mail service data SD3 includes a text message or an electronic mail delivered to a specific object. Particularly, the text message/E-mail service may be useful in a case that a real object is a person. For example, although a phone number or an E-mail address of the corresponding person is not known, a text message or an E-mail may be transmitted to a terminal belonged to the corresponding person. In an exemplary embodiment, a user previews a specific person and requests a transmitting of a text message or an E-mail to a terminal (i.e., a target real object) of the previewed person through a terminal 300, an object identification system 100 determines a target virtual object corresponding to the terminal of the previewed person, and then stores a text message or an E-mail transmitted by the user to the text message/E-mail service data SD3 of a service data set 115 corresponding to the target virtual object. In this case, when an owner of a terminal that is a target real object wants to receive a text message or an E-mail that is delivered thereto, the text message of the E-mail included on the text message/E-mail service data SD3 may be transmitted to a terminal that is the target real object. In another exemplary embodiment, when a user may request an object identification of a terminal (i.e., a target real object) of the previewed person and then a target virtual object may be determined because the object identification system 100 is capable of identifying a terminal of the previewed person, the user writes a text message or an E-mail to transmit the written text message or the written E-mail to the object identification system 100. Thus, the text message or E-mail transmitted by the user may be stored in the text message/E-mail service data SD3 of a virtual object corresponding to the previewed person.

As described above in detail, when an object identification system according to the present exemplary embodiment of the present invention, a text message or an E-mail may be transmitted to a terminal belonged to the corresponding person although a phone number or an E-mail address of the corresponding person is not known, so that it is possible to utilize a new wireless Internet service using the object identification system. In this case, a user may select whether a text message or an E-mail is received or not.

An Internet connection service data SD4 includes a Uniform Resource Locator (URL) value that is so called as an address of a Website related to a corresponding real object 50. For example, a user previews a specific store or a product through a terminal 300 and commands a displaying of a Website related to the store or the product, an object identification system 100 determines a target virtual object corresponding to the previewed store or the previewed product (i.e., a target real object) of a virtual objects 110 to transmit a URL value included in an Internet access service data SD4 of a service data set 115 of the target virtual object. Thus, a Website related to the previewed store or the previewed product is displayed on a screen of the terminal 300. When a URL value of a related Website is plural, a representative Website may be displayed on the screen of the terminal 300 or one of Websites may be displayed on the screen of the terminal 300 by the user's choice. Thus, it is possible to intuitively and immediately access a Website related to an object without a search by inputting an address or a basic data such as a keyword.

A file attaching service data SD5 includes files attached by a user, which is related to a corresponding real object 50. In another words, a virtual object of an object identification system corresponding to a real object 50 may play a role of a server storing the attached files. For example, when a pamphlet of a conference or a party in which many people are attended is distributed in an electronic document type, a host side establishes a virtual object by defining a conference area or a party area into an object. When the pamphlet of the electronic document type is stored to a service data set 115 of a virtual object corresponding to the conference area or the party area, attendees may easily receive the pamphlet of the electronic document type by using an attach file receiving function at the conference area or the party area. In another exemplary embodiment, when a user previews a theater or a record shop through a terminal 300 and commands a providing of an attach file related to the theater or the record shop, an object identification system 100 may determine a target virtual object corresponding to the previewed theater or the previewed record shop to transmit a preview movie file or a sample music file that are included in the file attaching service data SD5 to the terminal 300. Alternatively, an object is defined as an industrial product, a usage manual of industrial products may be attached in an electronic document type. When a file for distributing to unspecified people is existed even though it is not related to an object, the file may be attached to a specific object such as a public place. Moreover, as a concept similar to a web hard of a wired Internet, when a user wants to attach a personal file to a specific object as a personal purpose, it may be utilized as for downloading.

A service data included in the service data set 115 is not limited to the information service data SD1, the memo/bulletin service data SD2, the text message/E-mail service data SD3, the Internet connection service data SD4 and the file attaching service data SD5 that are shown in FIG. 3. That is, the service data included in the service data set 115 may further include another service data different from the five services. Alternatively, at least one of the five services may be excluded from the service data included in the service data set 115. For one example, the service data included in the service data set 115 may further include a list of terminals accessed to a wireless communication service or a wireless Internet service (hereinafter, referred to as "an access to a real object") by intermediating a current real object. For another example, the service data included in the service data set 115 may further include data for the list of terminals which were recently accessed to the real object.

According to an exemplary embodiment of the present invention, an attribute data set 111 of the virtual object 110 may further include a connecting object as an attribute value. A term "a relation object" used in the specification and claims means a sharing a service data related to a first real object and a service data related to a second real object by including an attribute value of a first virtual object corresponding to a first real object and a second virtual object corresponding to a second real object so as to relate real objects that are different from each other. For example, in a case that a desktop computer at home is established as a first real object and a laptop computer in a company is established as a second real object, when the first real object is previewed to request a service, a service substantially identical to a previewing the second real object to request a service may be provided or a portion of a service shared among a total service may be provided. That is, the object identification system 100 determines a target virtual object corresponding to the target real object, and then transmits the shared service data of service data included in a service data set of a relation object of the determined target virtual object to the terminal 300.

As another example, it is assumed that a vehicle parked at an outdoor is a first real object and an owner of the vehicle is a second real object. When the first real object that is the vehicle is previewed to transmit a message informing that the vehicle is illegally parked at a state that the vehicle is set as a target real object, the message is delivered to a terminal of the vehicle's owner corresponding to the second real object that is a relation object of the vehicle that is the first real object.

The relation object may be set that service data corresponding to one party is only shared by another party. For example, when a third person leaves a memo message on a laptop computer of an office as a target real object, the memo message left on the laptop computer may be checked through a desktop computer at home as a target real object that is a relation object of the laptop computer. In contrast, when a third person leaves a memo message on a desktop computer at home as a target real object, the memo message left on the desktop computer is not checked through a laptop computer of an office. As described above in detail, a case that a sharing of a service data set is provided in one side may be defined as "substituting object" in this application.

Figure 4:
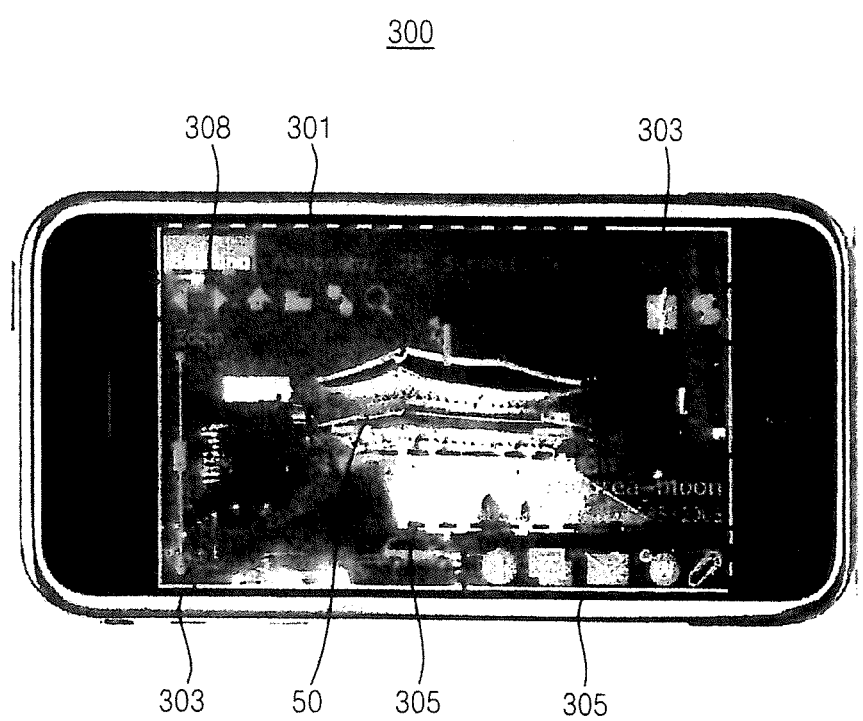
FIG. 4 is a photograph showing a status in which a real object is previewed by a terminal used in an object identification system in accordance with an exemplary embodiment of the present invention.

FIG. 4 is a photograph showing a status in which a real object is previewed by a terminal used in an object identification system in accordance with an exemplary embodiment of the present invention.

Referring to FIG. 4, when a terminal 300 according to an exemplary embodiment of the present invention previews a real object 50, an object selection part 301, a zoom adjusting part 303, a service selection part 305 and an information display part 307 are displayed on a screen of the terminal 300 as well as the previewed real object 50. The object selection part 301, the zoom adjusting part 303 and the service selection part 305 may be displayed on the screen in a text or an icon. In addition, the object selection part 301, the zoom adjusting part 303 and the service selection part 305 may perform an input function such as a touch screen. Alternatively, the object selection part 301, the zoom adjusting part 303 and the service selection part 305 may be separated from the screen to be disposed at the terminal 300 as an input means such as a button.

As described with reference to FIG. 3, a real object 500 may be classified into a first classification R1, a second classification R2, a third classification R3, a fourth classification R4 and a fifth classification R5. The first classification R1 may consist of real objects of which a position is fixed. The second classification R2 may consist of real objects of which a moving path according to time is regular. The third classification R3 may consist of industrial products or objects having a unique identification parameter which identifies a target through a near field communication ("NFC") such as an RFID and a unique identification mark such as a barcode, a product serial number, etc. The fourth classification R4 may consist of images or design such as texts, trade mark, emblem, etc. The fifth classification R5 may consist of a person and an owner of a terminal identifying an object identification system. According to an embodiment classifying the real object 50 into five, the object selection part 301 is configured to select five kinds of objects corresponding to the first to fifth classifications R1, R2, R3, R4 and R5.

For example, when a real object 50 is a specific place such as a building, a street, a shop, squares, a historic site, etc., or an object of which a position is fixed such as a tree, a monument, a statue, etc., a user may select "Building" tab of plural tabs displayed on the object selection part 301. When a real object 50 is traffic means such as bus, train, etc., or an object of which a moving path according to a time is regular such as the sun, the moon, etc., a user may select "Astronomy" tab of plural tabs displayed on the object selection part 301. When a real object 50 is an object having a unique identification parameter such as an RFID tag, a user may select "ID" tab of plural tabs displayed on the object selection part 301. When a real object 50 is a text or a pattern such as a trademark, an emblem, etc., a user may select "Symbol&Text" tab of plural tabs displayed on the object selection part 301. When a real object 50 is a person having a terminal capable of identifying an object identification system, a user may select "Human" tab of plural tabs displayed on the object selection part 301.

The zoom adjusting part 303 displays a distance between the real object and the terminal and performs a distance adjusting function. For example, a distance between the target real object and the terminal 300 may be automatically adjusted by using an auto-focusing function of an image identification part. Alternatively, a user may adjust the distance value between the target real object and the terminal 300 by using the zoom adjusting part 303. When a place in which a target for an auto-focusing function such as squares or an inner of a bus is not existed is selected as an object, a user may adjust a distance to a predetermined value or a zero (0). When the real object is celestial bodies such as the moon, a distance may be adjusted to infinite; however, it may be adjusted to infinite through the zoom adjusting part 303.

The service selection part 305 may play a role of selecting a service included in a service data set 115 of the virtual object described in FIG. 3. For example, the service selection part 305 may include five icons requesting information service data SD1, memo/bulletin service data SD2, text message/E-mail service data SD3, Internet connection service data SD4 and file attaching service data SD5 that are described in FIG. 3.

The information display part 307 may display basic text information such as a name, a definition, a history, etc., of the previewed real object 50. For example, when a user previews the old palace as shown in FIG. 4, a name of the previewed old palace, an established year, a brief information, etc., may be displayed on the information display part 307. In an exemplary embodiment, a user requests more detail information, the detail information may be displayed on another display screen.

A first function selection part 308 for selecting one of objects, searching an identical object, transmitting an image of an object, etc., and a second function selection part 309 for generating an object or managing personal information or personal records may be further displayed on a screen of the terminal 300.

A screen displaying of a terminal shown in FIG. 4 is only described as an example; however, contents or functions corresponding to a screen of a terminal shown in FIG. 4 are not limited to that exemplary embodiment.

Figure 5:
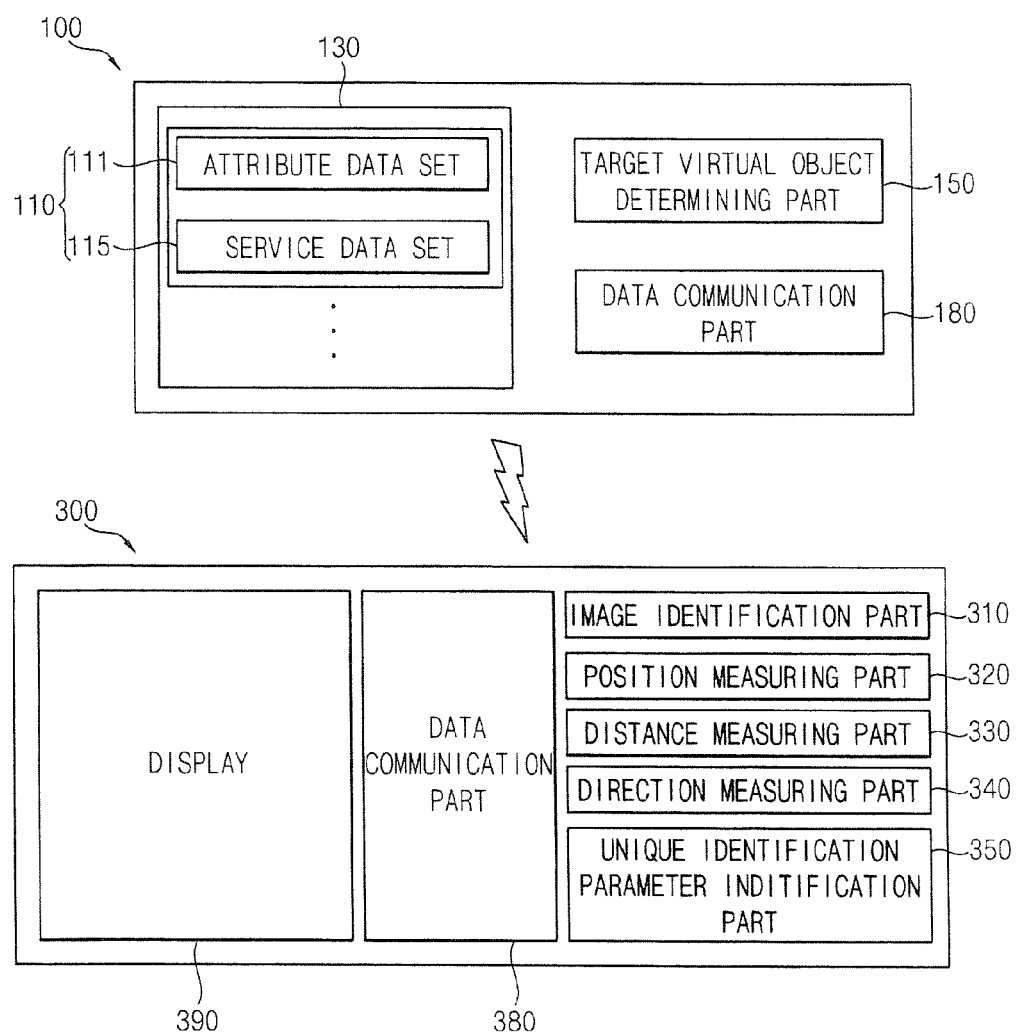
FIG. 5 is a block diagram showing a configuration of the object identification system and the terminal shown in FIG. 1.
Figure 6:
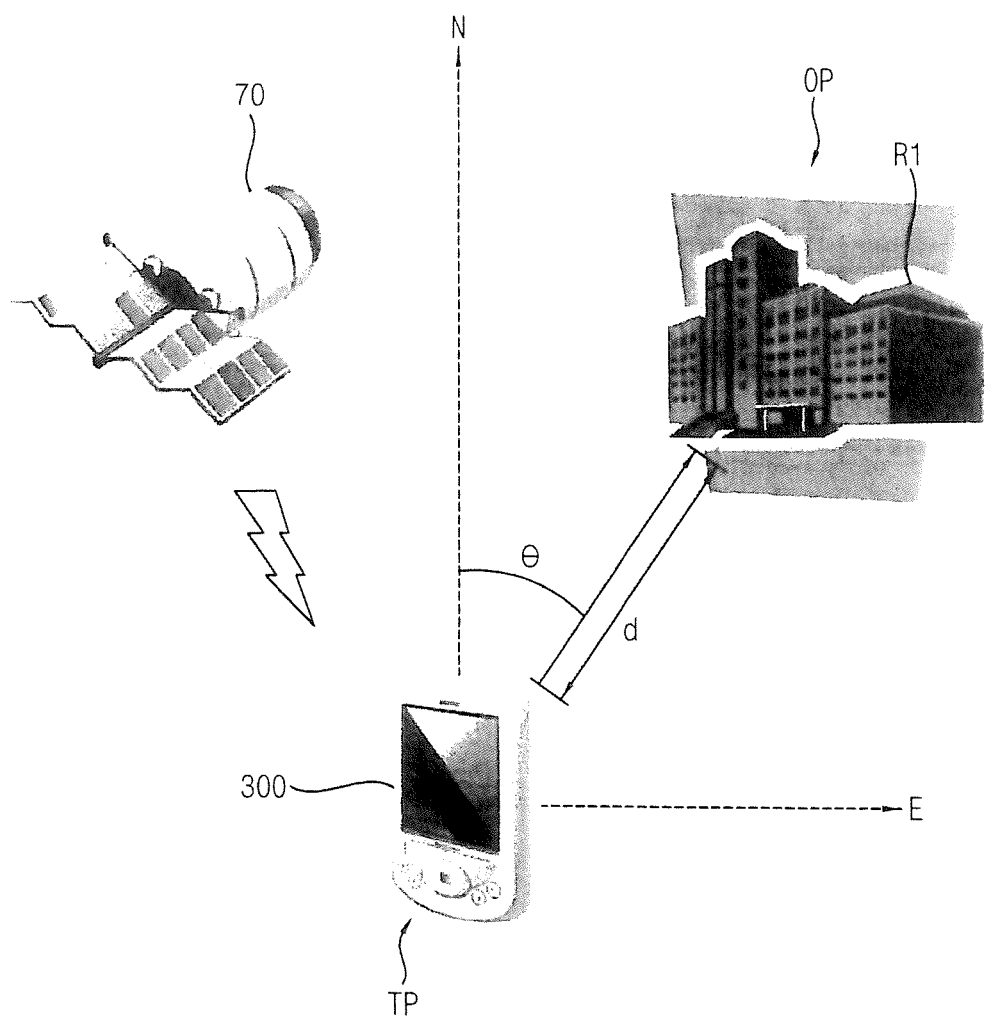
FIG. 6 is a concept diagram explaining a method of identifying a real object having a position value by an object identification system in accordance with an exemplary embodiment of the present invention.

FIG. 5 is a block diagram showing a configuration of the object identification system and the terminal shown in FIG. 1. FIG. 6 is a concept diagram explaining a method of identifying a real object having a position value by an object identification system in accordance with an exemplary embodiment of the present invention.

Referring to FIGS. 5 and 6, an object identification system 100 according to an exemplary embodiment of the present invention includes a virtual object DB 130 and a target virtual object determining part 150.

Plural virtual objects 110 are stored in the virtual object DB 130. As described with reference to FIG. 3, each of the virtual objects 110 includes an attribute data set 111 including an attribute value of the real object 50 and a service data set 115 including a service data related to the real object 50. A description for the virtual object 110, the attribute data set 111 and the service data set 115 is explained in detail with refer to FIG. 3, and thus description for the virtual object 110, the attribute data set 111 and the service data set 115 will be omitted.

The target virtual object determining part 150 receives a real object identification data of a target real object previewed by a terminal 300 to compute an attribute value of the target real object. The target virtual object determining part 150 determines a virtual object having an attribute value matched with an attribute value of the computed target real object of plural virtual objects stored in the virtual object DB as a target virtual object.

The real object identification data means a basis data for identifying a real object. The real object identification data may be varied in accordance with a kind of a real object. For example, when a real object has a fixed position value, the real object identification data may be configured by data for computing a position value of the real object. When a real object is a text, a trademark, a pattern, etc., a text or an image identified by a terminal may be the real object identification data. When a real object is a matter to which a unique identification parameter such as a barcode, a product number, an RFID tag, etc., are attached, an identifying information stored in the unique identification parameter may be the real object identification data.

The terminal 300 used in an object identification system according to an exemplary embodiment of the present invention includes an image identification part 310, a position measuring part 320, a distance measuring part 330 and a direction measuring part 340. The terminal 300 generates the real object identification data by using the image identification part 310, the position measuring part 320, the distance measuring part 330 and the direction measuring part 340.

The image identification part 310 is used as a tool for previewing a real object. Moreover, the image identification part 310 may be used as a tool which generates image data of the real object. In one exemplary embodiment, the image identification part 310 may include a camera, a scanner, a barcode reader, an infrared light sensor, etc.

The position measuring part 320 generates a current position value of a terminal 300. As shown in FIG. 6, in an exemplary embodiment, the position measuring part 320 includes a global positioning system (GPS) receiver capable of communicating with a GPS satellite 70. That is, the position measuring part 320 of the terminal 300 generates a position value of the terminal 300 that is a portion of a real object identification data by using the GPS receiver. Alternatively, the position measuring part 320 may generate a position value of the terminal 300 by measuring a distance between the terminal 300 and a base station such as a wireless local area network access point (WLAN AP) or a distance between the terminal 300 and a repeater.

The distance measuring part 330 generates a distance value between a terminal 300 and a real object. In an exemplary embodiment, the distance measuring part 330 may generate a distance value between the terminal 300 and the real object by using a distance measuring system included in an auto-focusing apparatus used to an imaging device such as a camera. For example, the distance measuring system outputs ultrasonic waves or infrared lights to a real object so as to measure a distance between the terminal 300 and the real object, and measures a returning time of the ultrasonic waves or the infrared lights to compute the distance. Alternatively, infrared lights may be continuously irradiated to a real object in various directions, and then a distance between the terminal and the real object may be computed in a triangulation method by using an infrared-lights-irradiating angle when a strength of the infrared lights reflected by the real object is the maximum. Further alternatively, a strength of infrared lights reflected by a real object may be measured to compute a distance between a terminal and the real object. Furthermore alternatively, various distance measuring systems adapted to an auto-focus camera may be used to compute a distance between a terminal and a real object.

A distance value between the terminal 300 and a real object included in the real object identification data may be a distance value automatically generated by the distance measuring part 330. Alternatively, a distance value between the terminal 300 and a real object included in the real object identification data may be a specific value inputted by a user. In an exemplary embodiment, when a user selects a specific distance value by using a tool such as the zoom adjusting part 303 of FIG. 4, the terminal 300 may transmit the selected distance value as a portion of a real object identification data to an object identification system 100. For example, when a target corresponding to an auto-focus function is not existed or a place itself corresponding to a user is selected as an object, a distance value may be selected as zero (0). When a real object is celestial bodies such as the moon, a distance may be adjusted to infinite.

The direction measuring part 340 generates an azimuth value of a direction for viewing a real object through the terminal 300. Moreover, the direction measuring part 340 may generate a slope value representing a slope amount of the terminal 300.

In one exemplary embodiment, the direction measuring part 340 includes a geomagnetic sensor which checks a flow of a magnetic field generated from the earth to detect a direction of a terminal. The geomagnetic sensor detects a variation of a current amount or a voltage amount that is varied in accordance with a relationship between a magnetic field generated by a sensor and a terrestrial magnetism generated by the earth magnetic field, and generates an azimuth value which corresponds to a direction of the terminal 300 toward a real object.

The geomagnetic sensor may be classified into a fluxgate type geomagnetic sensor, a magneto-impedance type geomagnetic sensor, a magneto-resistive type geomagnetic sensor, a hall type geomagnetic sensor, etc. The fluxgate type geomagnetic sensor may use a material of high magnetic permeability, such as permalloy, as a magnetic core to apply excitation by a driving coil and measure second harmonics. The excitation is proportional to an external magnetic field, using magnetic saturation and a non-linear magnetism of the magnetic coil, thereby measuring a degree and a direction of an external magnetic field. The magneto-impedance type geomagnetic sensor may use a principle that a high frequency current is applied to an amorphous magnetic substance to increase impedance due to a surface effect of the magnetic substance, thereby increasing an output voltage. The magneto-resistive type geomagnetic sensor may use a voltage difference generated when a resistance is varied due to an effect of a magnetic field. The hall type geomagnetic sensor may use a voltage difference generated by a variation of an inner magnetic field which is varied by an external magnetic field.

The direction measuring part 340 may further include an acceleration sensor (not shown) which measures a slope angle of the terminal 300 with respect to an acceleration of gravity. When the slope angle of the terminal 300 is measured by using the acceleration sensor, a height value of a previewed target real object may be generated by the terminal 300.

A principle of measuring a slope angle of a terminal 300 by using an acceleration sensor will be hereinafter described. The gravitational acceleration is defined as an acceleration generated by a gravity acting on a moving object (i.e., gravity movement). When the acceleration sensor located in a horizontal direction is tilted to 90 degrees and, thus, is located in a vertical direction under the influence of the gravity of the Earth, the detected gravitational acceleration has a magnitude of 1 G(9.8 m/s2). Therefore, the gravitational acceleration is related to sine(tilt angle). For example, when a magnitude of the acceleration sensor is 0.5 G as a result of measurement, a tilt angle of the object may be 30 degrees. When the acceleration detected by the acceleration sensor has a magnitude of 0 G in the x-axis and 1 G in the y-axis, it can be detected that the terminal is vertically placed along the y-axis direction, and otherwise, it can be detected that the terminal is horizontally placed along the x-axis direction.

The acceleration sensor may be classified into a piezoresistor type acceleration sensor, a capacitor type acceleration sensor, etc., in accordance with an acceleration detecting method. The piezoresistor type acceleration sensor uses a piezo resist effect in which a resistance is generated by modifying of a crystal lattice when an external force is applied to a crystal. That is, a stress is generated due to a moving of a device so that a resistance variation is detected in a current or in a voltage. In the capacitor type acceleration sensor, a proof mass positioned at a center portion of two electrodes is moved toward a counter electrode due to an acceleration to generate a capacitance difference, so that the capacitance difference is sensed to sense an acceleration.

In one example, the direction measuring part 340 may include a motion sensor on which a 3-axis geomagnetic sensor and a 3-axis acceleration sensor are integrated. When the motion sensor is used, an azimuth corresponding to a direction for viewing a real object through a terminal 300 and a slope value of the terminal 300 are simultaneously generated.

The terminal 300 may further include a unique identification parameter identification part 350.

The unique identification parameter identification part 350 identifies a unique identification parameter storing an identify information for identifying matters such as a radio frequency identification ("RFID") tag. For example, the unique identification parameter identification part 350 includes an RFID reader which identifies identification information of the real object stored in the RFID tag.

Here, an RFID is a technology that an electronic tag is attached to an object and the object is recognized and identified through a communication by using a radio frequency. When the RFID reader irradiates a radio wave onto the RFID tag, the RFID tag is activated by obtaining an energy from a received radio wave. The activated RFID tag may modify an information value of a memory by using the energy or may return the information value to the RFID reader. In this case, the RFID reader transmits collected information, so that the collected information is utilized or used in another application field.

When a real object is an industrial product or a matter to which a near distance communication identification means such as a RFID tag or a unique identification parameter is attached, the terminal 300 may treat an information stored in a RFID tag of the real object, which is collected by the unique identification parameter identification part 350, as a real object identification data to transmit an object identification system 100 without measuring an additional real object identification data such as a position value of the terminal 300 or a distance value between the real object and the terminal 300, or an azimuth value.

The object identification system 100 and the terminal 300 may further include data communication parts 180 and 380 for transmitting and receiving data.

Referring to FIGS. 5 and 6, a method of identifying a building R1 that is a real object having a fixed position value will be explained in detail.

When a real object such as a building R1 has a fixed position value, an essential attribute value of the real object is a position value.

In the present exemplary embodiment, the terminal 300 sets a building R1 as a target real object by previewing the building R1 through the image identification part 310 and the display 390 to generate a real object identification data. In this case, the real object identification data may include a position value 'tp' of the terminal 300, a distance value 'd' between the terminal 300 and the bus R22 and an azimuth value 'θ' of the bus R22 with respect to the north 'N'.

A position value 'tp' of the terminal 300 may be generated by the position measuring part 320 described above. A distance value 'd' between the terminal 300 and the building R1 may be generated by the distance measuring part 330 described above. An azimuth value 'θ' of the building R1 may be generated by the distance measuring part 340 described above. A real object identification data including the position value 'tp' of the terminal 300, the distance value 'd' between the terminal 300 and the building R1, and the azimuth value 'θ' of the building R1 may be transmitted to an object identification system 100.

The target virtual object determining part 150 of the object identification system 100 computes a position value 'op' (i.e., an attribute value of the target real object) of the building R1 by using the real object identification data transmitted by the terminal 300, that is, the position value 'tp' of the terminal 300, the distance value 'd' between the terminal 300 and the building R1, and the azimuth value 'θ' of the building R1 based on the north N. When the position value 'tp' of the terminal 300, and the distance 'd' and azimuth value θ informing a relative position relationship between the terminal 300 and the building R1 are known, a position value 'op' of the building R1 may be computed.

The target virtual object determining part 150 of the object identification system 100 searches a virtual object 110 having a position value matched with a position value op of a calculated building R1 as an attribute value of an attribute data set 111. When a virtual object 110 corresponding to the building R1 (that is, a real object corresponding to a fixed position value) is stored in a virtual object DB 130 of an object identification system 100 and an attribute data set 111 of a virtual object 110 corresponding to the building R1 includes a position value 'op' of the building R1, the target virtual object determining part 150 of the object identification system 100 determines a virtual object 110 corresponding to the building R1 as a target virtual object. A meaning of the target virtual object was defined as a virtual object corresponding to a target real object previewed by the terminal 300.

In one exemplary embodiment, when a virtual object 110 having a position value matched with a position value 'op' of a building R1 that is the target real object is not existed, a new virtual object 110 may be established to be perform a process storing the new virtual object in the virtual object DB. A user may determine whether a virtual object 110 is established through the terminal 300 or not, and then may input a service data related to the established virtual object 110. When the number of virtual objects having an attribute value matched with an attribute value of the target real object is no less than two, a user may finally select a target virtual object. Alternatively, when the number of real objects previewed by the terminal 300 is no less than two, a user may select a wanted real object as a target real object to proceed the following process.

A target virtual object determining part 150 of an object identification system 100 determines a target virtual object corresponding to the building R1, the object identification system 100 may transmit a service data included in a service data set 115 of the determined target virtual object to the terminal 300.

As described with reference to FIG. 3, a service data included in the service data set 115 may include information service data, memo/bulletin service data, text message/E-mail service data, Internet connection service data, file attaching service data, etc.

For example, the building R1 is a shop and a user selects a memo/bulletin service, a memo/bulletin data related to the previewed shop may be displayed on a screen of the terminal 300. Moreover, the user posts up an appraisal related to the previewed store or a visitor's list through the terminal 300. Alternatively, the user leaves a memo which will be delivered to a predetermined person through the terminal 300. Alternatively, when an Internet access service is selected, a Website related to the previewed building R1 may be displayed on the terminal 300. A detailed explanation for a service data was described in detail with reference to FIG. 3, so that detailed description for the service data will be omitted.

In the present exemplary embodiment, it is described that a real object having a fixed position value is a building R1; however, the real object having a fixed position value is not limited to the building R1. Alternatively, the real object may be a specific place such as a street, squares, a historic site, an office, etc., or an object of which a position is fixed such as a tree, a monument, a statue, a bench, etc. Moreover, the real object may be limited to a specific place, a detailed place of a building, a specific floor of a building, etc. For one example, the real object may be subdivided into a front of a building, a specific floor of a building, a specific room of a building, a bathroom of a specific place, etc. For another example, the real object may be subdivided into an inner surface of a door of a first partition, a north wall within a specific shop, a menu table of a shop, etc., in more detail.

Figure 7:
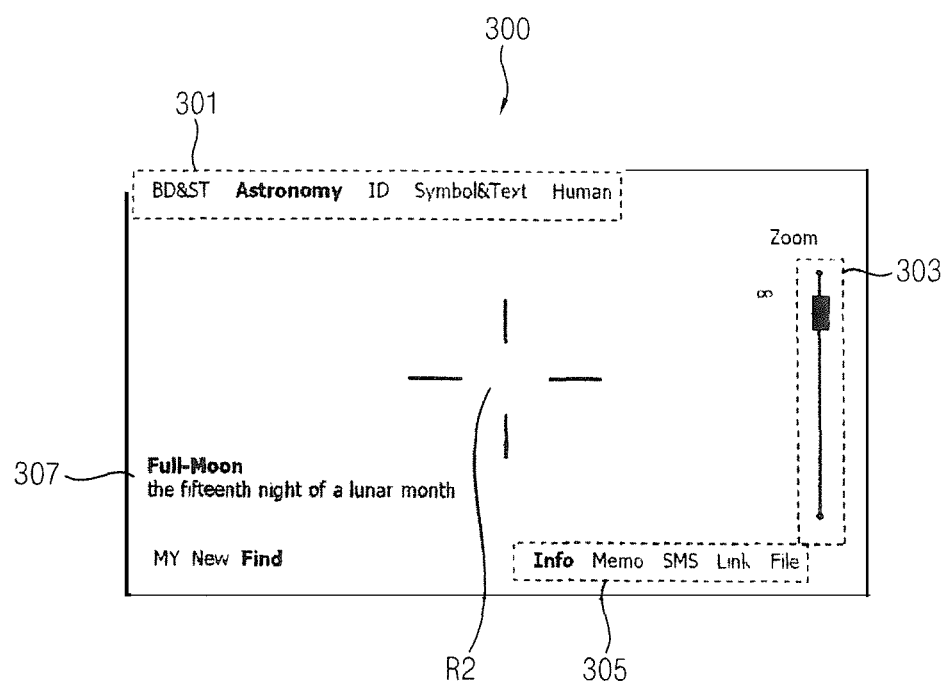
FIG. 7 is a photograph showing a status in which celestial bodies are previewed by a terminal in accordance with another exemplary embodiment of the present invention.
Figure 8:
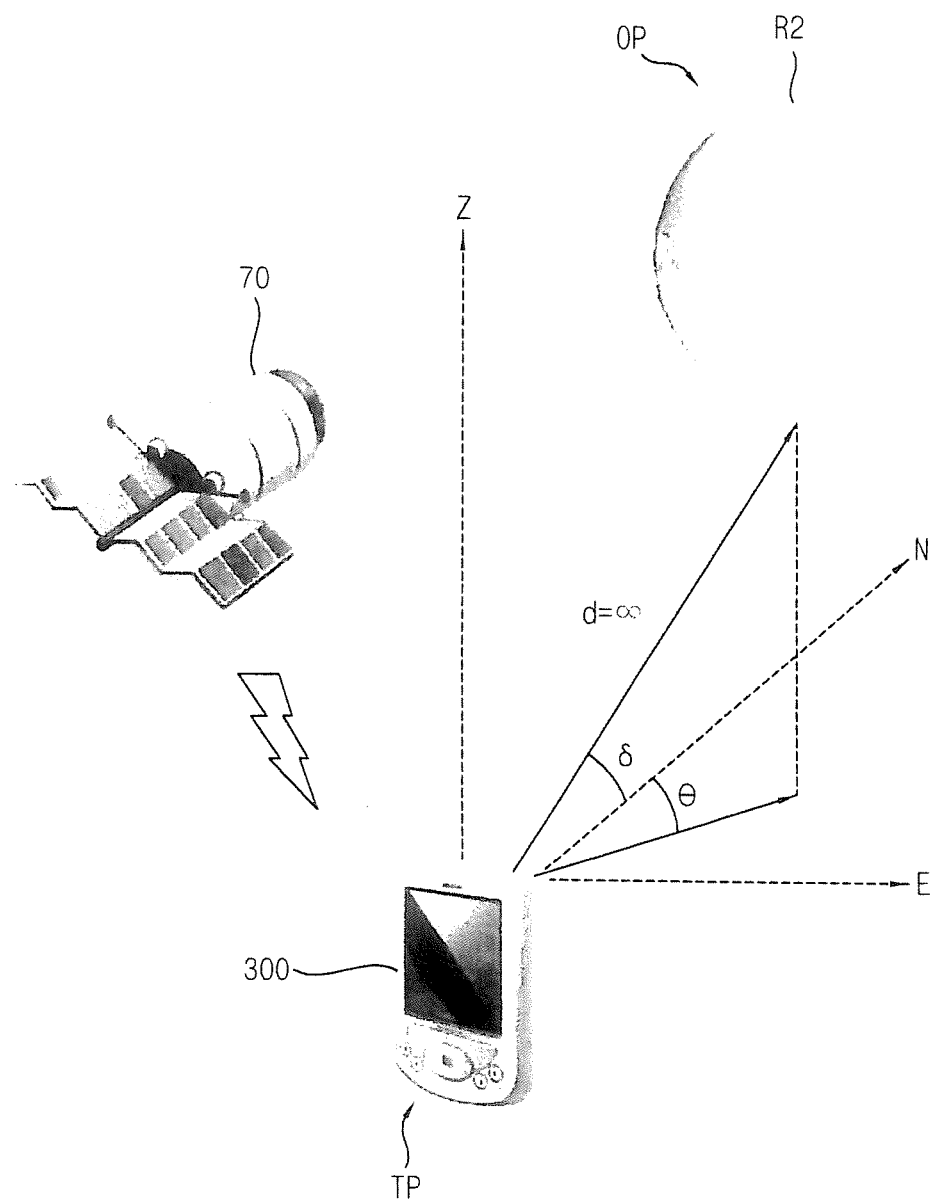
FIG. 8 is a concept diagram explaining a method of identifying celestial bodies shown in FIG. 7 as a real object by an object identification system.

FIG. 7 is a photograph showing a status in which celestial bodies are previewed by a terminal in accordance with another exemplary embodiment of the present invention. FIG. 8 is a concept diagram explaining a method of identifying celestial bodies shown in FIG. 7 as a real object by an object identification system.

A screen of the terminal of FIG. 7 is substantially the same as the screen of the terminal of FIG. 4 except celestial bodies of which a moving path and a position value are regular in accordance with a viewer position and a viewing time, and thus any repetitive detailed explanation for a detailed element and a menu will hereinafter be omitted. The same or like elements shown in FIG. 7 have been labeled with the same reference characters as used above to describe the exemplary embodiments of FIG. 4. Elements of an object identification system 100 and a terminal 300 which are not shown in FIG. 7 will be explained with reference to FIG. 5.

Referring to FIGS. 5, 7 and 8, when a real object R2 is previewed through a terminal 300, an object selection part 301, a zoom adjusting part 303, a service selection part 305 and an information display part 307 are displayed on a screen of the terminal 300 as well as the previewed real object R2.

The real object shown in FIGS. 7 and 8 is the full moon R2 of which a moving path is regular in accordance with a time and a distance between the terminal 300 and the real object is substantially infinite.

As described in FIG. 4, when a moving path of the real object in accordance with a time is regular as the celestial bodies such as the sun, the moon, etc., a user may select "Astronomy" tab arranged on the object selection part 301. In this case, in order to identify an object, the object identification system 100 may consider a date and a time when the real object is previewed.

The zoom adjusting part 303 displays a distance between a real object and a terminal and performs a distance adjusting function. When the real object is the celestial bodies such as the full moon R2, a distance may be adjusted to an infinite. Alternatively, a user may manually adjust a distance to an infinite through the zoom adjusting part 303.

The service selection part 305 may play a role of selecting a service included in a service data set 115 of a virtual object described with reference to FIG. 3. For example, the service selection part 305 may include five selection parts, which request information service data 'Info', memo/bulletin service data 'Memo', text message/E-mail service data 'SMS', Internet connection service data 'Link' and file attaching service data 'File'. In a screen shown in FIG. 7, an information service data 'Info' is selected.

An information display part 307 may display basic text information such as a name, a definition, a history, etc., of the previewed target real object. For example, when a user previews the full moon R2 as shown in FIG. 7, a name of the previewed full moon R2 and a lunar date when the full moon is previewed may be displayed on the information display part 307.

Since the celestial bodies are regularly run on the celestial sphere viewing at a place of a viewer in accordance with a date and a time, a position on the celestial sphere of the celestial bodies which is viewed by a viewer at a specific place in a specific data and time is known. That is, in a case that a real object is the celestial bodies, when a position value of a terminal 300, a data and time of previewing the celestial bodies through the terminal 300, and a position value on the celestial sphere are known, it is compared with a position on the celestial sphere of the celestial bodies depending on the data and time to identify the celestial bodies existed on the previewed position.

The terminal 300 sets the full moon R2 as a target real object by previewing the full moon R2 to generate a real object identification data. In this case, the real object identification data may include a position value 'tp' of the terminal 300, an azimuth value 'θ' of the full moon R2 with respect to the north 'N' on a coordinate defined by the north N, the east E and the ceiling Z, and a height value 'δ' of the full moon R2 based on the surface of the earth.

A position value 'tp' of the terminal 300 may be generated by a position measuring part 320. In on exemplary embodiment, the position measuring part 320 may further include a height indicator measuring a height of a terminal. That is, since a position of the full moon R2 viewing at a ground and a position of the full moon R2 viewed at the top of the mountain are different from each other, a height of the terminal (i.e., a height of a viewer) may be included in the real object identification data by using the height indicator measuring a height of a place of the terminal 300 in order to compensate the difference.

An azimuth value 'θ' of the full moon R2 based on the north N may be generated by a direction measuring part 340 described in FIG. 5. For example, the azimuth value 'θ' of the full moon R2 may be measured by using a geomagnetic sensor included in the direction measuring part 340. A height value 'δ' of the full moon R2 may be generated by measuring a slope for viewing the full moon R2. The slope of the terminal 300 may be measured by using an acceleration sensor or a slope sensor included in the direction measuring part 340 described in FIG. 5.

The real object identification data including the position value 'tp' of the terminal 300, the azimuth value 'θ' and the height value 'δ' of the full moon R2 is transmitted to an object identification system 100.

The target virtual object determining part 150 of the object identification system 100 described in FIG. 5 computes a position value 'op' on the celestial sphere of the previewed full moon R2 (i.e., an attribute value of the target real object) by using the real object identification data, that is, the position value 'tp' of the terminal 300, the height of the terminal 300, the azimuth value 'θ' of the full moon R2, and the height value 'δ' of the full moon R2.

A plurality of virtual objects, which has a position value of the celestial bodies according to dates and times on the celestial sphere viewed at a place of a viewer as an attribute value, is stored in the object identification system 100. Information according to dates and times may be obtained by using a clock of an object identification system 100 or may be obtained by using a time formation transmitted from the terminal 300.

The target virtual object determining part 150 assumes a position value 'tp' of the terminal 300 to be a position of a viewer, and compares plural virtual objects having a position value of the celestial bodies according to dates and times on the celestial sphere based on a position of the viewer as an attribute value with a position value 'op' of the celestial sphere of the computed full moon R2.

In this case, the target virtual object determining part 150 determines a virtual object having an attribute value corresponding to a position value on the celestial sphere, which is matched with a position value 'op' (i.e., an attribute value of the target real object) on the celestial sphere of the computed full moon R2 in the dates and times of the previewed full moon R2 on the celestial sphere based on a position of the terminal 300 to be a target virtual object. That is, the target virtual object determining part 150 computes a position value 'op' on the celestial sphere of the previewed celestial bodies R2 from the position value 'tp' of the terminal 300, the azimuth value θ of the celestial bodies R2 and the height value 'δ' of the celestial bodies R2, and then determines a virtual object having an attribute value which corresponds to a position value on the celestial sphere matched with the computed position value 'op' on the celestial sphere at dates and times of the previewed celestial bodies R2 to be a target virtual object. In the present exemplary embodiment, a virtual object corresponding to the moon may be determined as the target virtual object.

When "Astronomy" tab arranged on an object selection part 301 is selected, the object identification system 100 may identify an object in a different method different from a selection of a "Building" tab (or a "BD&ST" tab denotes a building and a distance) described in FIG. 6.

When the target virtual object determining part 150 of the object identification system 100 determines a target virtual object corresponding to the full moon R2, the object identification system 100 transmits a service data included in a service data set 115 of the determined target virtual object to the terminal 300. As described with reference to FIG. 3, a service data included in the service data set 115 may include information service data 'Info', memo/bulletin service data 'Memo', text message/E-mail service data 'SMS', Internet connection service data 'Link', file attaching service data 'File', etc.

For example, when a user selects a memo/bulletin service, a memo/bulletin service data bulletined to the previewed full moon R2 may be displayed on a screen of the terminal 300. In this case, a user may select a public condition such as a time for capable of reading the notice bulletined to the full moon R2, weather, a range of a receiver, a range of public contents, etc.

A natural object such as the full moon has a superior sensitive aspect to be previewed without a restriction of a place, so that it may be superior to an accessibility of persons. Thus, it is of a great advantage to an advertisement which targets to an unspecified person or an interindividual event service that is spatially separated.

When a real object is the moon, it is capable of identifying the full moon, the half moon and the new moon as an identical object regardless a shape of the moon, and of establishing different virtual objects in accordance with the shape of the moon varied in accordance with date. For example, the full moon, the half moon and the new moon are established as the different virtual objects, so that it may be established to identify real objects corresponding to the full moon, the half moon and the new moon as the different objects. Moreover, a specific meaning may be given to the sun of a new year's day, the full moon of a specific date, a well-known constellation such the north star, the big dipper, etc., and then virtual objects respectively corresponding to the above objects may separately managed.

A detailed explanation for a service data was described in detail with reference to FIG. 3, so that detailed description for the service data will be omitted.

Figure 9:
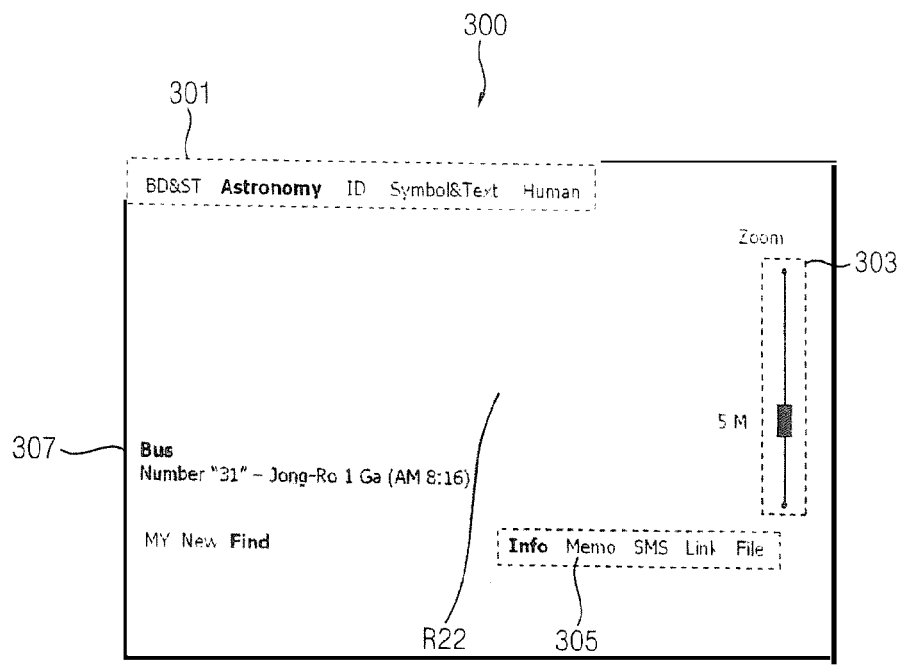
FIG. 9 is a photograph showing a status in which a real object regularly run in accordance with a time is previewed by a terminal in accordance with still another exemplary embodiment of the present invention.

FIG. 9 is a photograph showing a status in which a real object is regularly run in accordance with a time is previewed by a terminal in accordance with still another exemplary embodiment of the present invention.

A screen of the terminal of FIG. 9 is substantially the same as the screen of the terminal of FIG. 4 except traffic means of which a moving path is regular in accordance with a time, and thus any repetitive detailed explanation for a detailed element and a menu will hereinafter be omitted. The same or like elements shown in FIG. 9 have been labeled with the same reference characters as used above to describe the exemplary embodiments of FIG. 4. Elements of an object identification system 100 and a terminal 300 which are not shown in FIG. 9 will be explained with reference to FIG. 5, and an object identification method will be explained with reference to FIG. 6.

Referring to FIGS. 5, 6 and 9, when a real object R22 is previewed through a terminal 300, an object selection part 301, a zoom adjusting part 303, a service selection part 305 and an information display part 307 are displayed on a screen thereof as well as the previewed real object R22.

In the real object R22 shown in FIG. 9, a moving path according to a time is regular. In addition, a distance between a terminal 300 and the real object R22 may be measured differently with celestial bodies or may be set by a user.

As described in FIG. 4, when the real object has a regular moving path according to a time likewise traffic means such as a bus, a train, etc., a user may select "Astronomy" tab arranged on the object selection part 301. In this case, an object identification system 100 may consider a previewed time of a real object so as to identify the real object.

The zoom adjusting part 303 displays a distance between the real object and the terminal 300 and performs a distance adjusting function. The distance between the real object and the terminal 300 may be automatically adjusted. Alternatively, a user may select a distance through the zoom adjusting part 303.

The service selection part 305 may play a role of selecting a service included in a service data set 115 of a virtual object described with reference to FIG. 3 or 7. For example, the service selection part 305 may include five selection parts, which request information service data 'Info', memo/bulletin service data 'Memo', text message/E-mail service data 'SMS', Internet connection service data 'Link' and file attaching service data 'File'. In a screen shown in FIG. 9, an information service data 'Info' is selected.

The information display part 307 displays basic text information such as a name, a definition, a history, etc., of the previewed target real object. For example, as shown in FIG. 9, when a user previews No. 32 bus R22, a definition of the previewed No. 32 bus R22 and a previewing time may be display on the information display part 307. In addition, a running interval, a first run time, a last running time, a last station, etc., may be displayed on the information display part 307.

A traffic means is run to have a regular moving path and a regular moving period, so that a position value of a real object depending on a predetermined time is uniform even though a real object is moved. For example, when a bus or a train running on a driveway, a specific station or a stop time may be regular. Moreover, when it is identified that a position of a terminal of a user on the bus is moved along a regular path, it is identified that the user is boarded on a bus which runs a path identical to a moving path of the terminal.

As described above in detail, when a position value of a real object according to a time is determined, a virtual object having an attribute value corresponding to a moving path and a time may be computed so that a real object having a regular position value according to the time may be identified. For example, when the real object is bus, a virtual object corresponding to the bus may have a position value of the bus according to a time computed from a running schedule and a running time of the bus as an attribute value.

In the present exemplary embodiment, the terminal 300 sets a bus R22 as a target real object by previewing the bus R22 to generate a real object identification data. In this case, likewise, the real object of which a position is fixed described in FIG. 6, the real object identification data may include a position value 'tp' of the terminal 300, a distance value 'd' between the terminal 300 and the bus R22 and an azimuth value 'θ' of the bus R22 with respect to the north 'N'. A method of generating the real object identification data was described in detail with reference to FIGS. 5 and 6, so that detailed description thereof will be omitted.

A real object identification data including the position value 'tp' of a terminal 300, the distance value 'd' between the terminal 300 and a bus R22 and the azimuth value 'θ' of the bus R22 is transmitted to an object identification system 100. In an exemplary embodiment, information that a real object is a bus may be transmitted to an object identification system 100 in order to clarify a kind of an object, so that a category of a corresponding virtual object may be limited to the bus. In another exemplary embodiment, a distance value 'd' between the terminal 300 and the bus (that is, a traffic means which runs to have a regular moving path) may be set as zero, so that it may inform an object identification system 100 that an owner of the terminal 300 is boarded on the moving traffic means.

A target virtual object determining part 150 of the object identification system 100 computes a position value of the bus R22 through the real object identification data transmitted by the terminal 300.

A process after a position value of the bus R22 is computed is different from a case that a fixed object is a real object. Thus, as described above, since a position value of the bus R22 is regularly varied in accordance with a time, the target virtual object determining part 150 may identify an object considering the previewing time.

That is, since a virtual object having a moving path of the bus R22 and a position value according to a time as an attribute value is stored in the object identification system 100, an estimated position value that the bus R22 is previewed by the terminal 300 may be computed from an inner clock of the object identification system 100 and a time of the bus R22. Alternatively, a measured time by an inner clock of the terminal 300 may be used to compute the estimated position value instead of the measured time by the inner clock of the object identification system 100.

The target virtual object determining part 150 compares an attribute value of the computed virtual object with a position value of the computed bus R22 (i.e., an attribute value of the target real object) to determine a virtual object having a position value matched with a position value of the bus R22 at a previewing time as an attribute value to be a target virtual object. That is, the target virtual object determining part 150 computes a position value 'op' of the target real object R22 from a position value 'tp' of the terminal 300, a distance value 'd' between the target real object R22 and the terminal 300, and the azimuth value 'θ' of the target real object R22 to determine a virtual object having a position value matched with a position value 'op' of the computed target real object at a previewing time of the target real object R22 of virtual objects stored in the virtual object DB as an attribute value to be a target virtual object.

In an exemplary embodiment, when a user having the terminal 300 is on traffic means (i.e., a target real object) which are moved to a regular moving path, the moving path of the target real object is substantially the same as a moving path of the terminal 300 so that a position value according to a moving path and a moving time of the target real object may be computed from a variation value according to a time of a position value of the terminal 300. In this case, the target virtual object determining part 150 may compute a position value according to a moving path and a moving time of the target real object from a variation value according to a time of a position value of the terminal 300, and may determine a virtual object having an attribute value which corresponds to a position value according to a moving path and a time matched with a position value according to the computed moving path and time of virtual objects stored in the virtual object DB to be a target virtual object.

As described above in detail, when an "Astronomy" tab arranged on the object selection part 301 is selected, the object identification system 100 may identify an object by using a position considering with a time or a moving path differently from a case that a "Building" tab (or a "BD&ST" tab denotes a building and a distance) is selected.

In a case of a bus stop, the number of bus which stops at a predetermined time may be equal to or more than two. Thus, the number of a target virtual object determined by the target virtual object determining part 150 may be equal to or more than two. In this case, a user may select one of plural target virtual objects computed through the terminal 300 as a final target virtual object.

When a target virtual object corresponding to the bus R22 is determined, an object identification system 100 transmits a service data included in a service data set 115 of the determined target virtual object to the terminal 300.

As described with reference to FIG. 3, a service data included in the service data set 115 may include information service data 'Info', memo/bulletin service data 'Memo', text message/E-mail service data 'SMS', Internet connection service data 'Link', file attaching service data 'File', etc. A detailed explanation for a service data was described in detail with reference to FIG. 3, so that detailed description for the service data will be omitted.

In the present exemplary embodiment, it is described that a real object of which a moving path and a position value are regular in accordance with a time is a bus R22; however, the real object is not limited to the bus. That is, the real object of which a moving path and a position value are regular in accordance with a time may be a subway, a train, an airplane, a ship, etc.

Figure 10:
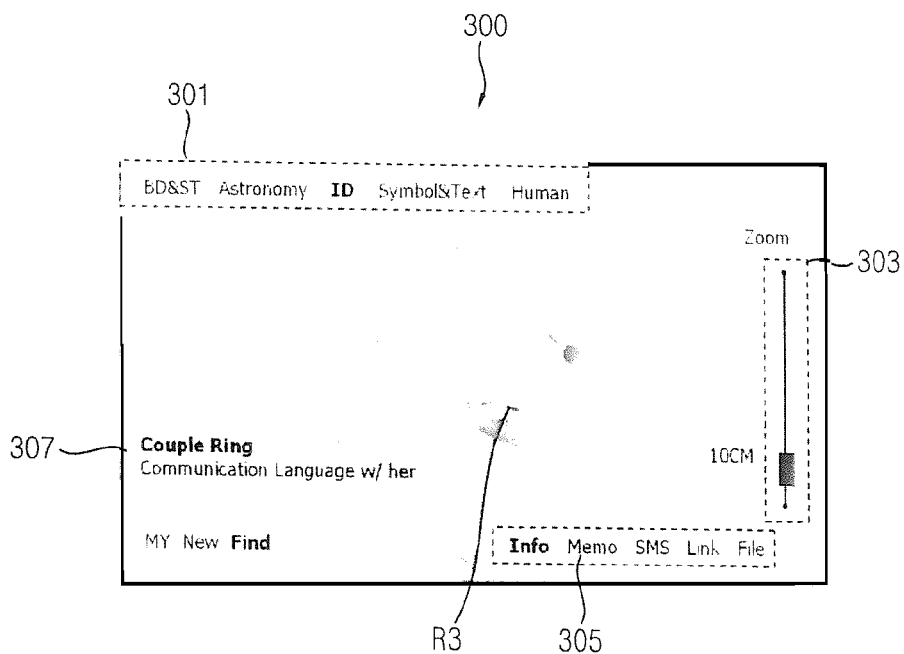
FIG. 10 is a photograph showing a status in which an object having an unique identification parameter attached thereto is previewed by a terminal in accordance with still another exemplary embodiment of the present invention.

FIG. 10 is a photograph showing a status in which an object having a unique identification parameter attached thereto is previewed by a terminal in accordance with still another exemplary embodiment of the present invention.

A screen of the terminal of FIG. 10 is substantially the same as the screen of the terminal of FIG. 4 except that a unique identification parameter such as a barcode, an RFID tag, etc., are attached to a real object, and thus any repetitive detailed explanation for a detailed element and a menu will hereinafter be omitted. The same or like elements shown in FIG. 10 have been labeled with the same reference characters as used above to describe the exemplary embodiments of FIG. 4. Elements of an object identification system 100 and a terminal 300 which are not shown in FIG. 10 will be explained with reference to FIG. 5.

Referring to FIGS. 5 and 10, when a real object R3 is previewed through a terminal 300, an object selection part 301, a zoom adjusting part 303, a service selection part 305 and an information display part 307 are displayed on a screen of the terminal 300 as well as the previewed real object R3.

A real object R3 shown in FIG. 10 includes industrial products or object in which a unique identification parameter such as a near field communicating identifying means such a barcode, a product number, an RFID tag, etc., is attached thereto.

As described in FIG. 4, when a real object is an industrial product or object to which a unique identification parameter such as a near field communicating identifying means such a barcode, a product number, an RFID tag, etc., is attached, a user selects "ID" tab among tabs arranged in the object selection part 301. In this case, an object identification system 100 identifies an object based on a real object identification data of a terminal 300 identifying the unique identification parameter. As defined the above, a term "unique identification parameter" means a medium such as a barcode, a radio frequency identification tag, etc., which includes a predetermined information for easily identifying matters or industrial products.

For one example, the unique identification parameter may be attached on industrial products or a packing paper, etc., that is a real object. For another example, the unique identification parameter may be embedded to the industrial products or an object itself.

The zoom adjusting part 303 displays a distance between the real object and the terminal 300 and performs a distance adjusting function. The distance between the real object and the terminal 300 may be automatically adjusted. Alternatively, a user may select a distance through the zoom adjusting part 303. In the present exemplary embodiment, the distance value between the terminal 300 and the object may play an accessorial role of identifying an object.

The service selection part 305 may play a role of selecting a service included in a service data set 115 of a virtual object described with reference to FIG. 3 or 7. For example, the service selection part 305 may include five selection parts, which request information service data 'Info', memo/bulletin service data 'Memo', text message/E-mail service data 'SMS', Internet connection service data 'Link' and file attaching service data 'File'. In a screen shown in FIG. 10, an information service data 'Info' is selected.

The information display part 307 may display basic text information such as a name, a definition, a history, etc., of the previewed real object 50. For example, when a user previews a ring R3 as shown in FIG. 10, information for the previewed ring R3 may be displayed on the information display part 307. For example, when a real object is an industrial product, a manufacturer, a manufacturing data, a price, etc., may be displayed on the information display part 307. When a real object is already purchased product or private matter, a user may directly input an attribute value such as an additional name, a definition, etc., to the information data "Info." For example, when the ring R3 is sent to someone as a gift, an owner of the ring R3 may change an attribute value such as a name of the ring R3, a meaning of the ring R3, etc.

In the present exemplary embodiment, the terminal 300 sets a ring R3 as a target real object by previewing the ring R3 to generate a real object identification data. In this case, the real object identification data may include identification information such as a product number, etc., stored in a unique identification parameter of the ring R3.

The real object identification data is generated by a unique identification parameter identification part 350 including a barcode identifier of a terminal 300 or an RFID reader. That is, when a real object is an industrial product or a matter to which a unique identification parameter such as an RFID tag is attached, the terminal 300 may treat an information stored in the unique identification parameter of the real object, which is collected by the unique identification parameter identification part 350, as a real object identification data to transmit an object identification system 100 without measuring an additional real object identification data such as a position value of the terminal 300 or a distance value between the real object and the terminal 300, or an azimuth value.

The target virtual object determining part 150 of the object identification system 100 determines a virtual object having an attribute value matched with information stored in the unique identification parameter into a target virtual object by using the real object identification data transmitted from the terminal 300. When a virtual object having an attribute value matched with an attribute value of the target real object is not existed, a new virtual object may be established to be stored in the virtual object DB. For example, when a virtual object having an attribute value corresponding to the target real object is not stored in the virtual object DB, a virtual object having identification information stored in the unique identification parameter as an attribute value may be established. The virtual object may be automatically established by the object identification system 100. Alternatively, the virtual object may be established in response to a request of the user. When the virtual object 110 is established by a request of a user, the user determines whether a virtual object 110 is established through the terminal 300 or not, and then may input a service data related to the established virtual object 110, for example, memo/bulletin service data, etc. In the majority of cases, a virtual object corresponding to industrial products having the unique identification parameter attached thereto may be established by a manufacturer of the industrial products or owner.

In one exemplary embodiment, even though industrial products have the same identify information, when positions identified by the terminal 300 are different from each other, it may be set to identify the different objects. For example, even though industrial products such as clocks displayed at a shop have the same identification information, when a customer purchases the clock to hang the clock at a wall of the customer's house, an object corresponding to the purchased clock may be different from an object corresponding to the clock displayed at the shop. In this case, a virtual object corresponding to the purchased clock may include a position value corresponding to a position of the clock as well as identification information stored on a unique identification parameter as an attribute value. Moreover, the object identification data may further include a position value of the terminal for computing a position value of the clock, a distance value between the target real object and the terminal, and an azimuth value of the target real object for measuring a direction for viewing the target real object through the terminal. The real object has a unique identification parameter attached thereto and an identification data stored on the unique identification parameter is identified, so that the object identification data may further include a position value of the terminal that is a sufficient data for identifying that the two industrial products are positioned at the different positions. In this case, the target virtual object determining part 150 may determine a virtual object having an identification information and a position value that are respectively matched with an identification information of the target real object and a position value of the terminal that are transmitted from the terminal as an attribute value to be a target virtual object. Thus, even though a unique identification parameter storing the same identification information is attached to a real object, it may be identified as the different real object, and virtual objects corresponding to the different real objects may be respectively stored in the object identification system 100.

When the target virtual object determining part 150 of the object identification system 100 determines a target virtual object corresponding to the ring R3, the object identification system 100 transmits a service data included in a service data set 115 of the determined target virtual object to the terminal 300. As described with reference to FIG. 3, a service data included in the service data set 115 may include information service data 'Info', memo/bulletin service data 'Memo', text message/E-mail service data 'SMS', Internet connection service data 'Link', file attaching service data 'File', etc.

For example, when a user selects a memo/bulletin service, a memo containing a meaning of a gift which is written by a person who presents the previewed ring R3 may be displayed on a screen of a terminal 300. In another exemplary embodiment, when an object is an electronic product and an Internet service "Link" is selected, Web pages related to the electronic product are displayed on the screen of the terminal 300 or videos informing an install method and using method of the electronic product may be displayed on the screen of the terminal 300.

A usage of the object having a unique identification parameter such as a barcode, an RFID tag, etc., may be limited to a matter such as the above-mentioned industrial products. That is, attaching the unique identification parameter to all real objects of a real world such as building, a nature matter, etc., is unfavorable to a cost aspect. Thus, an object identification system according to the present invention may identify an object in various methods such as an object identification method explained with reference to FIGS. 6 to 9, so that a range of a real object that is an identified target may be wider.

Figure 11:
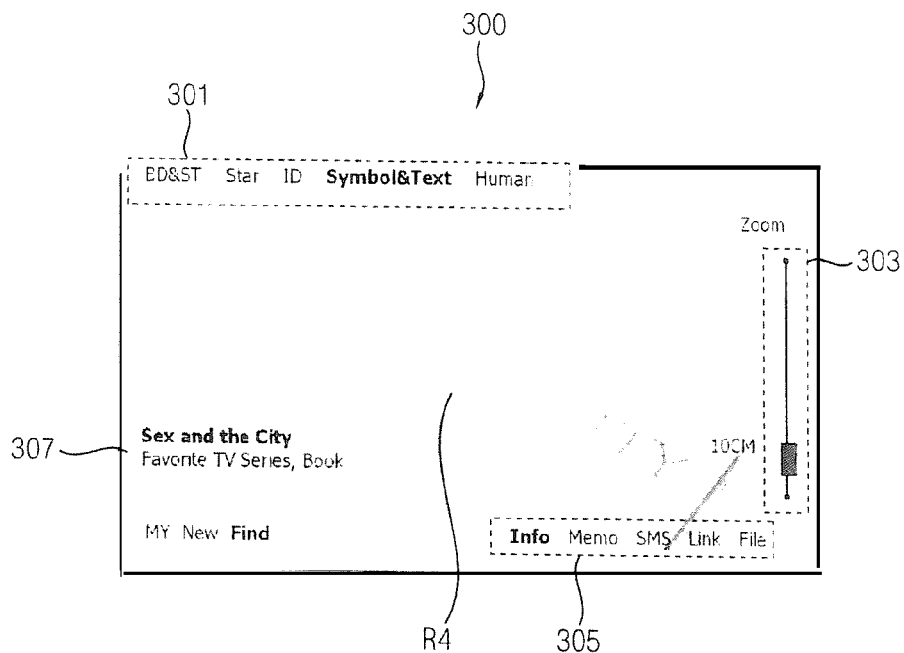
FIG. 11 is a photograph showing a status in which an image/text is previewed by a terminal in accordance with still another exemplary embodiment of the present invention.

FIG. 11 is a photograph showing a status in which image/text is previewed by a terminal in accordance with still another exemplary embodiment of the present invention.

A screen of the terminal of FIG. 11 is substantially the same as the screen of the terminal of FIG. 4 except that a text, a sign, a pattern, etc., are displayed on a real object, and thus any repetitive detailed explanation for a detailed element and a menu will hereinafter be omitted. The same or like elements shown in FIG. 11 have been labeled with the same reference characters as used above to describe the exemplary embodiments of FIG. 4. Elements of an object identification system 100 and a terminal 300 which are not shown in FIG. 11 will be explained with reference to FIG. 5.

Referring to FIGS. 5 and 11, when the terminal 300 previews a real object R4, an object selection part 301, a zoom adjusting part 303, a service selection part 305 and an information display part 307 are displayed on a screen of the terminal 300 as well as the previewed real object R4.

The real object R4 according to Exemplary embodiment 5 of the present invention shown in FIG. 11 includes a text such a title of a book or a cinema, a trademark of goods, an image such as an emblem of a sports team or a car.

As explained referring to FIG. 4, when an object is a symbol or a pattern such a text, a trademark of goods, an emblem of a car, a user selects "Symbol&Text" tab among tabs arranged in the object selection part 301. In this case, the object selection part 301 treats text data identified by the terminal 300 or image data such as a text, a trademark, a symbol, a pattern, etc., as real object identification data. In this case, the object identification system 100 has image data or text data corresponding to a text or a symbol of the real object as an attribute value.

The zoom adjusting part 303 displays a distance between the real object and the terminal 300 and performs a distance adjusting function. The distance between the real object and the terminal 300 may be automatically adjusted. Alternatively, a user may select a distance through the zoom adjusting part 303. The distance adjustment is required to identify an image data.

The service selection part 305 may play a role of selecting a service included in a service data set 115 of a virtual object described with reference to FIG. 3 or 7. For example, the service selection part 305 may include five selection parts, which request information service data 'Info', memo/bulletin service data 'Memo', text message/E-mail service data 'SMS', Internet connection service data 'Link' and file attaching service data 'File'. In a screen shown in FIG. 10, an information service data 'Info' is selected.

The information display part 307 may display basic text information such as a name, a definition, a history, etc., of the previewed real object. For example, when a user previews a book R4 as shown in FIG. 11, information of the previewed book R4 may be displayed on the information display part 307. For one example, when an object is an image of a cover itself such as a book, a music album, etc., a title of the book or the music album, author, singer, a publishing date, etc., may be displayed on the information display part 307. For another example, when an object is a trademark displayed on clothes, bag, etc., a title of the trademark, a name of a clothing company, a URL of the clothing company, etc., may be displayed on the information display part 307.

In the present exemplary embodiment, the terminal 300 sets a book R4 as a target real object by previewing the book R4 to generate a real object identification data. In this case, the real object identification data may include the image identified by an image identification part 310 of the terminal 300. In an exemplary embodiment, when an object is a text, a text identifying technology which converts an image data into a text data may be used to treat the converted text data as a real object identification data.

The terminal 300 transmits a real object identification data including an image or a text data that is identified by the image identification part 310 to an object identification system 100.

The target virtual object determining part 150 of the object identification system 100 determines a virtual object having an image data or a text data matched with the real object identification data (i.e., an image or a text) as an attribute value transmitted by the terminal 300 to be a target virtual object. When a virtual object having an attribute value matched with an attribute value of the target real object is not existed, a new virtual object may be established to be stored in the virtual object DB. For example, when a virtual object which has image data or text data corresponding to the target real object as an attribute value is not stored in the virtual object DB, a virtual object having identification information stored in the unique identification parameter as an attribute value may be established. The virtual object may be automatically established by the object identification system 100. Alternatively, the virtual object may be established in response to a request of the user. When the virtual object 110 is established by a request of a user, the user determines whether a virtual object 110 is established through the terminal 300 or not, and then may input a service data related to the established virtual object 110, for example, memo/bulletin service data, etc.

In one exemplary embodiment, even though an object has the same text data or the same image data, when positions identified by the terminal 300 are different from each other, it may be set to identify the different objects. For example, a book displayed on an A bookstore and a book displayed on a B bookstore, which is the same as the book displayed on the A bookstore, may be identified as the different objects. In this case, virtual objects corresponding to the books may include information of the bookstore in which the books are displayed (for example, a position value of a bookstore or a position value of a book) as an attribute value. Moreover, the object identification data may further include a position value of the terminal for computing a position value of the book (i.e., a target real object), a distance value between the target real object and the terminal, and an azimuth value of the target real object for measuring a direction for viewing the target real object through the terminal. The real object may be identified by a method of identifying an image or a text, so that the object identification data may further include a position value of the terminal that is a sufficient data for identifying that the two books (i.e., a target real object) are positioned at the different positions. In this case, the target virtual object determining part 150 may determine a virtual object having an image data and a position value that are respectively matched with an image data of the target real object and a position value of the terminal that are transmitted from the terminal as an attribute value to be a target virtual object. Thus, even though a real object has the same image or the same text, it may be identified as the different real object, and virtual objects corresponding to the different real objects may be respectively stored in the object identification system 100.

When the target virtual object determining part 150 of the object identification system 100 determines a target virtual object corresponding to the text, the trademark, the pattern, the image, etc., the object identification system 100 transmits a service data included in a service data set 115 of the determined target virtual object to the terminal 300. As described with reference to FIG. 3, a service data included in the service data set 115 may include information service data 'Info', memo/bulletin service data 'Memo', text message/E-mail service data 'SMS', Internet connection service data 'Link', file attaching service data 'File', etc.

For one example, when a user selects a memo/bulletin service, a notice such as an abstract, an opinion, etc., for the previewed book R4 may be displayed on a screen of the terminal 300. For another example, when a real object is a bag of a specific trademark and a user selects Internet access service "Link," a Webpage related to the trademark may be displayed on a screen of the terminal 300. A detailed explanation for a service data was described in detail with reference to FIG. 3, so that detailed description for the service data will be omitted.

When the image or the text is identified to identify an object, an image or text exactly agreed to or substantially the same as the image should be stored in a virtual object so that an extremely complex image may be identified as an object. Thus, a symbolic and simple pattern such as an image, a trademark or an emblem capable of being converted into a text may be preferable as a target of an object. An object identification system according to the present invention may identify an object in various methods such as an object identification method explained with reference to FIGS. 6 to 9, so that it is noticed that a limitation of a range of a real object that is an identified target is minimized.

Figure 12:
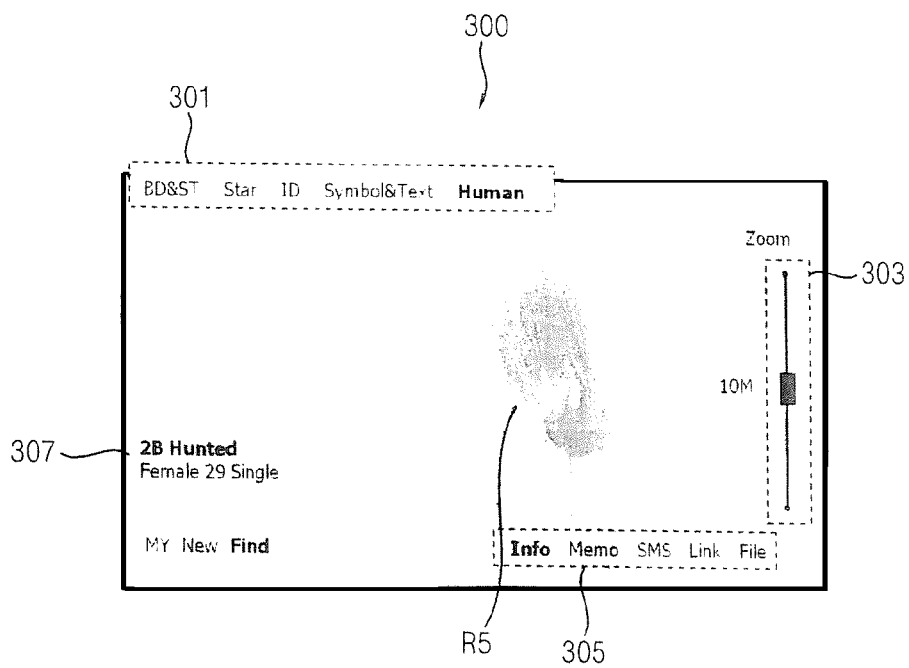
FIG. 12 is a photograph showing a status in which a person is previewed by a terminal in accordance with still another exemplary embodiment of the present invention.
Figure 13:
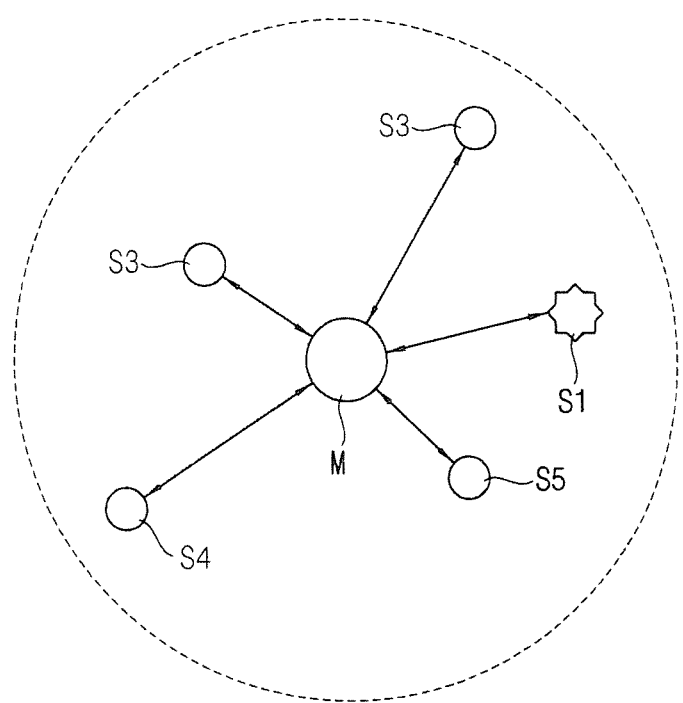
FIG. 13 is a concept diagram explaining a concept of a camera used in an object identification method in accordance with an exemplary embodiment of the present invention.
Figure 14:
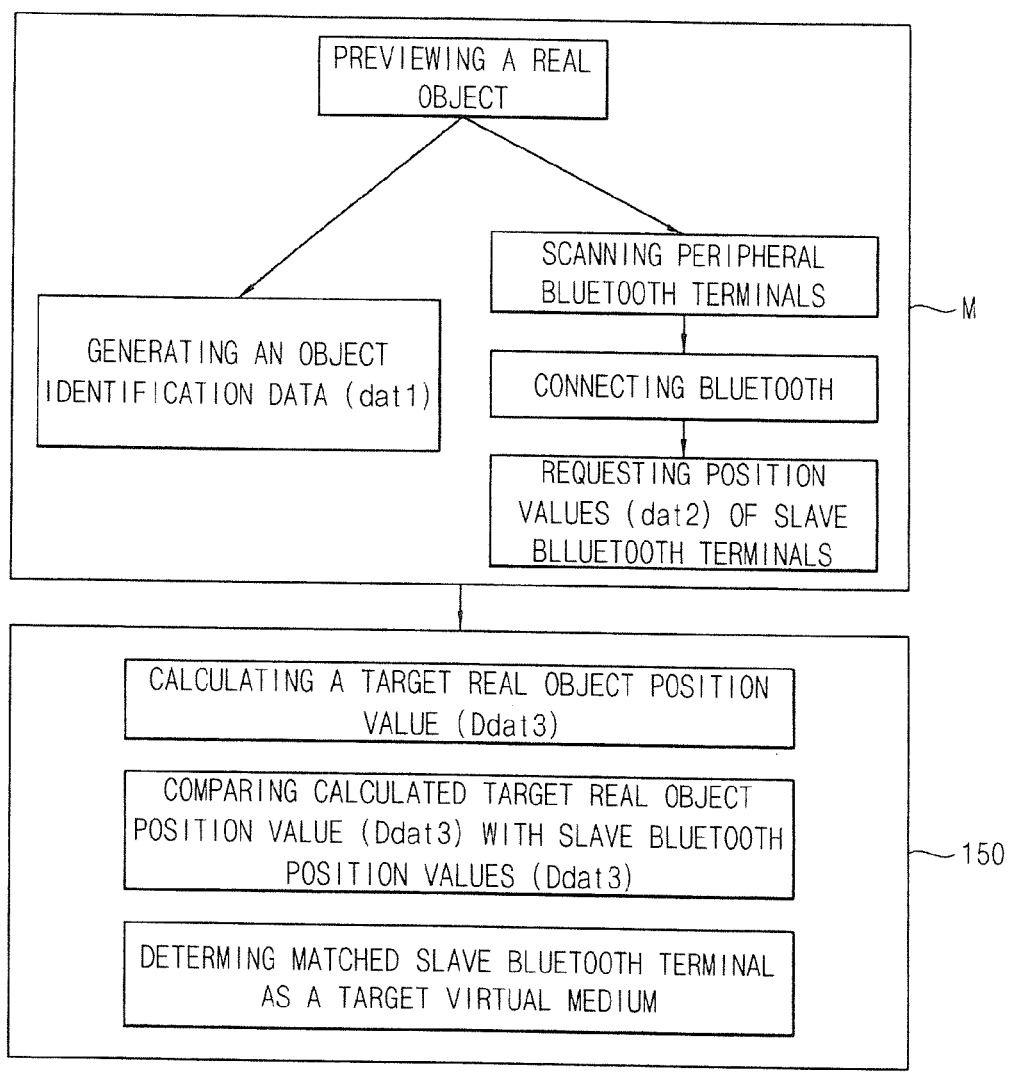
FIG. 14 is a flowchart explaining a method of identifying a user having a terminal by an object identification system in accordance with an exemplary embodiment of the present invention.

FIG. 12 is a photograph showing a status in which a person is previewed by a terminal in accordance with still another exemplary embodiment of the present invention. FIG. 13 is a concept diagram explaining a concept of a camera used in an object identification method in accordance with an exemplary embodiment of the present invention. FIG. 14 is a flowchart explaining a method of identifying user having a terminal by an object identification system in accordance with an exemplary embodiment of the present invention.

A screen of the terminal of FIG. 12 is substantially the same as the screen of the terminal of FIG. 4 except that a real object is an owner having a terminal, and thus any repetitive detailed explanation for a detailed element and a menu will hereinafter be omitted. The same or like elements shown in FIG. 12 have been labeled with the same reference characters as used above to describe the exemplary embodiments of FIG. 4. Elements of an object identification system 100 and a terminal 300 which are not shown in FIG. 12 will be explained with reference to FIG. 5.

Referring to FIGS. 5 and 12, when the terminal 300 previews a person R5 previewed, an object selection part 301, a zoom adjusting part 303, a service selection part 305 and an information display part 307 are displayed on a screen of the terminal 300 as well as the previewed person R5.

The real object R5 of FIG. 12 corresponds to an owner of a terminal. That is, according to an exemplary embodiment of FIG. 12, an object identification system identifies a terminal that is registered in the object identification system to indirectly identify an owner of the identified terminal.

As described with reference to FIG. 4, when an object is a person that is an owner of the terminal, a user selects a "Human" tab among tabs arranged on the object selection part 301. In this case, the object identification system 100 may treat identification information of the terminal belonged to person as a real object identification data. Hereinafter, in order to distinct a terminal of a user, a terminal belonged to a target person is defined as "object terminal," and an object terminal previewed by the user is defined as "target object terminal." Moreover, an owner of the object terminal is defined as "object owner."

A description for the zoom adjusting part 303 and the service selection part 305 will be omitted.

An information display part 307 displays a name, an age, an occupation, etc., of an object owner. The object owner may set whether personal information is opened to the public or not. For example, a limitation range of the personal information may be set to a name and a personal web page address. In another exemplary embodiment, a range of a person that is a publish target may be set. For example, a personal information may be opened to a terminal of 20's and 30's owner groups or may be opened to members participated to a predetermined gathering. For another example, personal information may be opened to a predetermined terminal which requests personal information.

In an exemplary embodiment, when a terminal 300 of a user may directly identify a product number of the previewed target object terminal or a personal identification number (PIN) of the terminal, the directly identified information may be treated as an object identification data. For example, as described with reference to FIG. 10, when a unique identification parameter such as an RFID tag is attached to a terminal of an object owner, an object is identified by using a terminal information stored in the unique identification parameter attached to the target object terminal in a same method the same as a method described in FIG. 10, and a service data related to an object owner having the identified target object terminal.

When a unique identification parameter such as an RFID tag storing information of a terminal is not attached to a target object terminal, a terminal may be identified in another method.

In one exemplary embodiment, it is possible to identify an object by using a position value of the target object terminal previewing an object owner. For example, when a virtual object of an object identification system 100 has a real time position value of the object terminal as an attribute value, likewise, a method of identifying an object of which a position is fixed described in FIG. 6, the target virtual object determining part 150 computes a position value of the target object terminal from a position value of the user terminal, a distance value between the user terminal and the target object terminal and an azimuth value of the target object terminal, and then determines a virtual object, which has a position value matching with a position value of the target object terminal as an attribute value, to be a target virtual object. Thus, it is possible to identify a target object terminal, and it is possible to provide a service data related to an object owner having the target object terminal.

When the object identification system 100 does not continuously update a real-time position value of the object terminal, it is impossible to use an identifying method of an object of which a position is fixed described with reference to FIG. 6. In addition, a position of a person is not fixed and a moving path and a moving period are not agreed, thus it is impossible to use a method identifying an object having a regular moving path and a regular period described with reference to FIGS. 7 to 9. In this case, even though a terminal 300 transmits information related to a position value of a target object terminal to an object identification system 100, it is impossible to identify an object by using a position value of an object terminal. Thus, it is necessary to indirectly obtain a position value of the object terminal by using a user terminal.

Referring to FIGS. 13 and 14, a method of identifying a target object terminal that is a terminal of the previewed object owner will be explained in detail.

In the present exemplary embodiment, when the object identification system 100 does not continuously update a real-time position value of the object terminal, Bluetooth for wireless communication at a near distance between wireless communication devices is used to indirectly obtain a position value of a target object terminal for identifying an object terminal. Bluetooth is an industrial specification for a personal area network (PAN), which is known as IEEE 802.15.1. Bluetooth provides the opportunity of using the mobile data in different applications. Bluetooth makes wireless communication between the two devices in a localized area of a room of an office or home very easily. Bluetooth technology uses radio-based links and all the connections between the devices and invisible and instantaneous with a low cost and a good security.

Bluetooth has several types: i) Class 1: A class 1 Bluetooth transceiver can discover pair and communicate with any Bluetooth transceiver within a radius of about 100 meters. ii) Class 2: A class 2 Bluetooth transceiver can discover pair and communicate with any Bluetooth transceiver within a radius of about 20 meters to about 30 meters seamlessly. iii) Class 3: A class 3 Bluetooth transceiver can discover pair and communicate with any Bluetooth transceiver within a radius of about 10 meters. In the present exemplary embodiment, the Class 3 may be used; however, the Class 1 or the Class 2 may be used.

In Bluetooth, a link is set in a master-slave method. One master is connected to seven slaves to configure network so called as piconet. In Bluetooth, 1600 numbers by a second are hopped by using a frequency hopping method. Slave units anticipated to a piconet are synchronized with a clock of a master. Thus, the slave units may perform a communication in accordance with a hopping sequence determined by the master.

In FIG. 13, one master terminal M and five slave terminals S1, S2, S3, S4 and S5 are shown. The master terminal means a terminal in which a Bluetooth device corresponding to a master is embedded, and the slave terminal means a terminal in which a Bluetooth device corresponding to a slave is embedded.

According to an exemplary embodiment of the present invention, a user previews an object terminal by using own terminal to request an object identification, a master terminal M corresponding to the user terminal transmits an inquiry message to slave terminals S1, S2, S3, S4 and S5 within a Bluetooth transmittance area. Here, a term "inquiry" is used in Bluetooth. That is, when an address (i.e., an identification numeral) of a counter part (that is, a slave) is not known, the term "inquiry" means that a response is requested to a predetermined slave in a peripheral area to connect a piconet of a master by searching peripheral slaves.

When the peripheral slave responses to the inquiry message of a master terminal M through "inquiry scan," the master terminal M and the slave terminal are wirelessly connected to each other. In the exemplary embodiment of FIG. 13, it is assumed that five slave terminals S1, S2, S3, S4 and S5 are connected to each other and a first slave terminal S1 is a previewed target object terminal.

When Bluetooth devices are connected to each other to configure a piconet, the Bluetooth devices may exchange information. A master terminal M requests a data set configured by a terminal identification information and a current position value such as Bluetooth identification code to five slave terminals S1, S2, S3, S4 and S5 configuring a piconet together with the first slave terminal S1. In this case, the Bluetooth identification code or terminal identification information is unique identification information of the slave terminal. The object identification system 100 includes a virtual object having an attribute value the terminal identification information and information related to an owner of the slave terminal corresponding to the terminal identification information. For example, the owner of the object terminal may be a person subscribed to a service for receiving a service of an object identification system 100, and information of the object owner and a terminal identification information for an object terminal of the object owner may be registered as an attribute value of a virtual object of the object identification system 100. That is, an attribute value corresponding to the object terminal may further include terminal identification information of the object terminal. Hereinafter, a data set configured by terminal identification information requested to the slave terminals S1, S2, S3, S4 and S5 by the master terminal M and a current position value may be defined as a "slave terminal data set."

When the slave terminals S1, S2, S3, S4 and S5 may generate data for a current position value by using GPS and so on, the slave terminals S1, S2, S3, S4 and S5 may transmit a current position value in response to a request of the master M. The master terminal M receives slave terminal data sets configured by each of terminal identification information for the slave terminals S1, S2, S3, S4 and S5 and position values from the slave terminals S1, S2, S3, S4 and S5, respectively, and transmits the slave terminal data sets to the target virtual object determining part 150.

The master terminal M generates an object identification data configured by a position value of the master terminal M, a distance value between the master terminal m and a target object terminal S1 and an azimuth value of the target object terminal S1 based on the north, likewise, generating an object identification data for identifying a position of a fixed matter described with reference to FIG. 6.

Hereinafter, an object identification data configured by a position value of the master terminal M, a distance value between the master terminal M and a target object terminal S1 and an azimuth value of the target object terminal S1 based on the north is referred as "dat1," position values of slave terminals S1, S2, S3, S4 and S5 transmitted from slave terminals S1, S2, S3, S4 and S5 are referred as "dat2." The position values of the slave terminals S1, S2, S3, S4 and S5 may be five in correspondence with each of the slave terminals S1, S2, S3, S4 and S5.

The target virtual object determining part 150 of the object identification system 100, which receives the object identification data dat1 and slave terminal data sets of the slave terminals S1, S2, S3, S4 and S5, as described in FIG. 6, computes a position value of the previewed target object terminal S1 by using a position value of the master terminal M, a distance value between the master terminal M and a target object terminal S1 and an azimuth value of the target object terminal S1 based on the north that are transmitted from the master terminal M. Hereinafter, a position value of the computed target object terminal S1 is referred as "dat3."

The target virtual object determining part 150 of the object identification system 100 compares a position value dat3 of the computed target object terminal S1 with position values dat2 of the slave terminals S1, S2, S3, S4 and S5 to obtain a terminal having a position value matched with a position value dat3 of the computed target object terminal S1. Thus, the target virtual object determining part 150 may determine a virtual object having a terminal identification information matched with a terminal identification information included in a slave terminal data set of an obtained slate terminal as an attribute value to be a target virtual object, and may transmit information for an owner of a target object terminal determined as the target virtual object to the master terminal M.

As described above in detail, real time position information of slave terminals within a transmitting area and terminal identification information are delivered by using Bluetooth even though a position of a terminal is varied in a real time, and a target object terminal S1 may be identified through computing a position value of the previewed object terminal and comparing with position values to identify a target object terminal S1.

When a target virtual object corresponding to a target object terminal S1 is set, a service data of the target virtual data set, which includes information service data 'Info', memo/bulletin service data 'Memo', text message/E-mail service data 'SMS', Internet connection service data 'Link' file attaching service data 'File', etc., may be transmitted to the master terminal M.

In one exemplary embodiment, even though a user does not know a phone number or an E-mail address of an owner R5 of an object terminal, when a text message/E-mail service is selected by a user in a state identifying an object terminal, it may transmit a text message or an E-mail message to complete strangers. For example, when a user previews a specific person R5 through a terminal to request a sending of the text message or an E-mail to a terminal of the previewed person R5, the text message or the E-mail message sent by the user is stored in a text message/E-mail service data of a service data set of the target virtual object, and then it may inform an owner R5 of the object terminal that a text message or an E-mail message is arrived. In this case, when an owner of a terminal that is a target real object wants to receive a text message or an E-mail message delivered thereto, the text message or the E-mail message included in the text message/E-mail service data may be delivered to the terminal that is the target real object. This service may be helpfully used when a talk is requested to complete strangers.

In one exemplary embodiment, in a case that a user selects Internet connection service and a counter person set to a personal web page to be immediately connected, when a person is previewed by a terminal, a personal web page corresponding to the previewed person may be easily accessed thereto.

As described above in detail, when an object identification system according to the present invention is used, it may easily access to a webpage only by previewing an object without directly inputting a URL address through an input device such as a keyboard or a touch pen or using a searching program, so that easy and intuitive wireless Internet environment may be realized and a utilization of wireless Internet may be increased.

Moreover, an identification method is various and a range of an identification target is wider, so that it may be adapted to various objects. In addition, it may provide Internet service based on a real object over a conventional Internet service handing an only virtual object.

Moreover, when it intuitively selects an object that is a target, the selected object may be identified and a service program related to the identified target may be executed, so that various and new higher value-added businesses such as Internet service by the media of a real object, intuitive and sensitive content business, etc., may be created.

In this exemplary embodiment, an object identification system, a terminal, a range of an object, a service content, etc., are explained as an example. Thus, it is not to be constructed as limiting thereof, and it will be apparent to persons of ordinary skill in the art.

Therefore, the present invention may be adapted to a wireless communication service or a wireless Internet system using a mobile terminal.

The foregoing is illustrative of the present invention and is not to be construed as limiting thereof. Although a few example embodiments of the present invention have been described, those skilled in the art will readily appreciate that many modifications are possible in the example embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific example embodiments disclosed, and that modifications to the disclosed example embodiments, as well as other example embodiments, are intended to be included within the scope of the appended claims. The present invention is defined by the following claims, with equivalents of the claims to be included therein.

What is claimed is:

1. An object identification system comprising:
   a virtual object database (DB) coupled to a processor storing a plurality of virtual objects, the virtual objects comprising an attribute data set includes an attribute value of a real object and a service data set comprising a service data related to the real object; and
   a target virtual object determining part receiving a real object identification data of a target real object previewed by a terminal to compute an attribute value of the target real object, and determine a virtual object having an attribute value matched to an attribute value of the computed target real object of plural virtual object stored in the virtual object DB as a target virtual object,
   wherein the real object identification data comprises a position value of the terminal, a distance value between the target real object and the terminal, and an azimuth value of the target real object for measuring a direction to view the target real object through the terminal;
   wherein the position value of the terminal is fixed to comprise:
   a position value of a real object corresponding to an attribute value of the virtual object, and
   a target virtual object determining part computes the position value of the target real object from the position value of the terminal, the distance value between the target real object and the terminal, and the azimuth value of the target real object to determine a virtual object having a position value matched to the position value of the target real object as an attribute value to be a target virtual object, and
   wherein a service data included in the service data set of the determined target virtual object by the target virtual object determining part is transmitted to the terminal.

2. The object identification system of claim 1, wherein the target real object is moved in a regular moving path to have a regular position value according to a time, an attribute value of the virtual object comprises a moving path of a real object moved along a regular path and a position value according to a time, and
   wherein the target virtual object determining part computes the position value of the target real object from the position value of the terminal, the distance value between the target real object and the terminal, and the azimuth value of the target real object to determine a virtual object having a position value matched to the position value of the computed target real object at a time when the target real object is previewed as an attribute value to be a target virtual object.

3. The object identification system of claim 1, wherein the target real object is moved to have a regular moving path in which a regular position value according to a time regular, the real object identification data is a variation value according to a time of a position value of the terminal, the attribute value of the virtual object comprises a moving path of a real object moved along a regular path and a position value according to a time, and
   wherein the target virtual object determining part computes a position value according to a moving path and a time of the target real object from a variation value according to a time of a position value of the terminal to determine a virtual object having a position value according to a moving path and a time matched to the computed moving path and a time of virtual objects stored in the virtual object DB as an attribute value to be a target virtual object.

4. The object identification system of claim 1, wherein the target real object is celestial bodies, the real object identification data comprises a position value of the terminal, an azimuth value of the target real object and a height value of the celestial bodies, the attribute value of the virtual object comprises a date, a time of a corresponding celestial bodies and a position value on a celestial sphere according to a position of a viewer, and
   wherein the target virtual object determining part computes a position value on a celestial sphere of the previewed celestial bodies from a position value of the terminal, the azimuth value of the of the celestial bodies and the height value of the celestial bodies, to determine a virtual object having a position value on the celestial sphere matched to the computed position value on the celestial sphere at a time when the celestial bodies are is previewed as an attribute value to be a target virtual object.

5. The object identification system of claim 4, wherein the real object identification data further comprises a height value of the terminal, and the target virtual object determining part computes a position value on the previewed celestial sphere from the position of the terminal, the azimuth value of the celestial bodies, the height value of the celestial bodies and the height value of the terminal.

6. The object identification system of claim 1, wherein the target real object is a matter to which a unique identification parameter storing identification information for identifying an object is attached, the real object identification data comprises identification information of the target real object stored in the unique identification parameter, an attribute value of the virtual object comprises identification information corresponding to an attribute value of the virtual object, and wherein the target virtual object determining part determines a virtual object having identification information matched to identification information of the target real object transmitted from the terminal of plural virtual objects stored on the virtual object DB as an attribute value to be a target virtual object.

7. The object identification system of claim 6, wherein the unique identification parameter comprises a barcode or a radio frequency identification (RFID) tag.

8. The object identification system of claim 1, wherein the real object identification data further comprises a position value of the terminal, an attribute value of the virtual object further comprises a position value of a corresponding real object, and wherein the target virtual object determining part determines a virtual object having identification information and a position value that are respectively matched to identification information of the target real object and a position value of the terminal transmitted from the terminal of plural virtual objects stored on the virtual object DB as an attribute value to be a target virtual object.

9. The object identification system of claim 1, wherein the target real object comprises a text or a symbol, the real object identification data comprises text data that is the text converted thereto or image data that is the symbol converted thereto, an attribute value of the virtual object comprises text data or image data of the real object corresponding to the attribute value of the virtual object, and wherein the target virtual object determining part determines a virtual object having text data or image data that are respectively matched to the text data or the image data of the target real object transmitted from the terminal of plural virtual objects stored on the virtual object DB as an attribute value to be a target virtual object.

10. The object identification system of claim 9, wherein the real object identification data further comprises a position value of the terminal, an attribute value of the virtual object further comprises a position value of a corresponding real object, and wherein the target virtual object determining part determines a virtual object having image data and a position value that are respectively matched to the image data and the position value of the target real object transmitted from the terminal of plural virtual objects stored on the virtual object DB as an attribute value to be a target virtual object.

11. The object identification system of claim 1, wherein the target real object is a target object terminal possessed by a previewed person, the real object identification data comprises a position value of a user terminal, a distance value between the user terminal and the target object terminal and an azimuth value of the target object terminal, an attribute value of the virtual object is a position value of an object terminal corresponding to a time of previewed by the target object terminal, and wherein the target virtual object determining part computes a position value of the target object terminal from the position value of the user terminal, the distance value between the user terminal and the target object terminal and the azimuth value of the target object terminal to determine a virtual object having a position value matched to a position value of the target object terminal as an attribute value to be a target virtual object.

12. The object identification system of claim 1 wherein the attribute value of the virtual object further comprises terminal identification information of an object terminal, the user terminal and the target object terminal use Bluetooth, the user terminal corresponds to a master terminal, the target object terminal is included in at least one slave terminal, the master terminal receives a slave terminal data set comprising a terminal identification information and a position value of the slave terminal from that at least one slave terminal to transmit the slave terminal data set to the target virtual object determining part, and wherein the target virtual object determining part compares the computed position value of the target object terminal with a position value of the at least one slave terminal included in the slave terminal data set to obtain a slave terminal having a position value matched to the computed position value of the target object terminal, and determines a virtual object having a terminal identification information matched to a terminal identification information included in a slave terminal data set of the obtained slave terminal as an attribute value to be a target virtual object.

13. The object identification system of claim 1, wherein the attribute value of the virtual object comprises a relation object sharing the service data, and a service data shared with the target virtual object of a service data included in a service data set of a relation object included in the determined attribute value of the target virtual object is transmitted to the terminal.

14. The object identification system of claim 1, wherein a service data included in the service data set is information service data related to the target real object, and information service data included in a service data set of the target virtual object determined by the target virtual object determining part is displayed on the terminal.

15. The object identification system of claim 1, wherein a service data included in the service data set is memo/bulletin service data related to the target real object, and memo/bulletin service data included in a service data set of the target virtual object determined by the target virtual object determining part is displayed on the terminal, or memo/bulletin service data inputted by the terminal is stored in a service data set of the target virtual object.

16. The object identification system of claim 1, wherein a service data included in the service data set is text message/E-mail service data comprising a text message of an E-mail message delivered to the target real object, and the text message/E-mail service data comprising a text message of an E-mail message transmitted by the terminal is stored in a service data set of a target virtual object determined by the target virtual object determining part.

17. The object identification system of claim 1, wherein a service data included in the service data set is a Uniform Resource Locator (URL) of a Website related to the target real object, and the URL included in a service data set of a target virtual object determined by the target virtual object determining part is transmitted to the terminal, so that a Website related to the target real object is displayed on the terminal.

18. The object identification system of claim 1, wherein a service data included in the service data set is a file attaching service data related to the target real object, and an attaching file included in a service data set of a target virtual object determined by the target virtual object determining part is transmitted to the terminal, or an attaching file attached by the terminal is stored in a service data set of the target virtual object.

19. The object identification system of claim 1, wherein a service data included in the service data set comprises a list of terminals accessed to the target real object or a list of terminals recently accessed to the target real object.

20. The object identification system of claim 1, wherein when a virtual object having an attribute value matching with an attribute value of the target real object is not existed, a new virtual object is established to be stored in the virtual object DB.

21. The object identification system of claim 1, wherein when the number of a virtual object having an attribute value matching with an attribute value of the target real object is no less than two, a virtual object selected by the terminal is determined as a target virtual object.

22. The object identification system of claim 1, wherein the virtual object comprises a main virtual object and at least one sub-virtual object, the main virtual object and the sub-virtual object respectively corresponding to the same real object to have attribute values different from each other or service data different from each other.

23. A system of an object-based wireless communication service for obtaining information related an object by identifying an object intuitively selected by a terminal, the system comprising:
 a terminal having a memory coupled to a processor, said terminal comprising:
 an image identification part for previewing a target real object to generate a real object identification data for identifying the previewed target real object; and
 an object identification system receiving a real object identification data generated by the terminal to compute an attribute value of the target real object, determining a virtual object having an attribute value matched to an attribute value of the computed target real object of plural virtual objects into a virtual object, and transmitting a service data included in a service data set of the determined target virtual object to the terminal, wherein the object identification system comprises:
 a virtual object database (DB) storing plural virtual objects comprising an attribute data set comprising an attribute value of a real object and a service data set comprising a service data related to the real object; and
 a target object determining part receiving a real object identification data generated by the terminal to compute an attribute value of the target real object, and determining a virtual object having an attribute value matched to an attribute value of the computed target real object of the plural virtual objects stored in the virtual object DB to be a virtual object, and
 wherein the real object identification data comprises a position value of the terminal, a distance value between the target real object and the terminal, and an azimuth value of the target real object for measuring a direction to view the target real object through the terminal;
 wherein the position value of the terminal is fixed to comprise:
 a position value of a real object corresponding to an attribute value of the virtual object, and
 a target virtual object determining part computes the position value of the target real object from the position value of the terminal, the distance value between the target real object and the terminal, and the azimuth value of the target real object to determine a virtual object having a position value matched to the position value of the target real object as an attribute value to be a target virtual object.

24. The system of claim 23, wherein the real object identification data comprises a position value of a terminal, a distance value between a target real object previewed by the terminal and an azimuth value of the target real object for measuring a direction for viewing the target real object through the terminal.

25. The system of claim 24, wherein the terminal comprises a position measuring part generating a position value of the terminal.

26. The system of claim 25, wherein the position measuring part of the terminal comprises a global positioning system (GPS) receiver to generate the position value of the terminal by using a GPS.

27. The system of claim 25, wherein the position measuring part of the terminal measures a distance between an access point (AP) at an inner room or an outer room and the terminal to generate the position value of the terminal.

28. The system of claim 24, wherein the terminal comprises a distance measuring part generating a distance value between the terminal and the target real object.

29. The system of claim 28, wherein the distance measuring part of the terminal measures a distance value between the previewed target real object and the terminal by using a distance measuring system included in an auto-focus device of the image identification part.

30. The system of claim 24, wherein the terminal comprises a zoom adjusting part which adjusts a distance value between the terminal and the target real object.

31. The system of claim 24, wherein the terminal comprises a direction measuring part generating an azimuth value of the target real object.

32. The system of claim 31, wherein the direction measuring part comprises a geomagnetic sensor which checks a flow of a magnetic field generated from the earth to detect a direction of a terminal to generate an azimuth value of the target real object.

33. The system of claim 32, wherein the real object identification data further comprises a height value of the target real object, and the direction measuring part further comprises an acceleration sensor which measures a slope angle of the terminal with respect to an acceleration of a gravity to generate a height value of the target real object.

34. The system of claim 31, wherein the direction measuring part comprises a motion sensor in which a geomagnetic sensor and a motion sensor are integrated, wherein the geomagnetic sensor checks a flow of a magnetic field generated from the earth to detect a direction of a terminal, and
 the acceleration sensor measures a slope angle of the terminal with respect to an acceleration of a gravity to generate a height value of the target real object.

35. The system of claim 23, wherein the real object identification data comprises identification information of the target real object stored in a unique identification parameter storing identification information for identifying an object, and the terminal comprises a unique identification parameter identification part which identifies a unique identification parameter storing identification information of the target real object.

36. The system of claim 35, wherein the unique identification parameter is a radio frequency identification (RFID) tag, and the unique identification parameter identification part comprises an RFID reader which identifies identification information of the target real object stored in the RFID tag.

37. The system of claim 23, wherein the real object identification data comprises text data or image data, and an image identification part of the terminal identifies an image of a target real object to generate the image data or the text data.

38. The system of claim 23, wherein the target real object is a target object terminal possessed by a previewed person, the terminal and the target object terminal use Bluetooth, the user terminal corresponds to a master terminal, the target object terminal is included in at least one slave terminal, and
the master terminal receives a slave terminal data set comprising terminal identification information and a position value of the slave terminal from that at least one slave terminal to transmit the slave terminal data set to the target virtual object determining part.

39. A method of servicing a wireless communication based on an object, the method comprising:
generating a real object identification data for identifying a target real object previewed by a terminal;
transmitting the generated real object identification data to an object identification system storing plural virtual objects includes an attribute value of a real object and a service data related to the real object;
receiving the real object identification data to compute an attribute value of the target real object and obtaining a virtual object having an attribute value matched to the computed attribute value of the target real object of the plural virtual objects to determine a target virtual object corresponding to the target real object;
wherein the real object identification data comprises a position value of the terminal, a distance value between the target real object and the terminal, and an azimuth value of the target real object for measuring a direction to view the target real object through the terminal;
wherein the position value of the terminal is fixed to comprise:
a position value of a real object corresponding to an attribute value of the virtual object, and
a target virtual object determining part computes the position value of the target real object from the position value of the terminal, the distance value between the target real object and the terminal, and the azimuth value of the target real object to determine a virtual object having a position value matched to the position value of the target real object as an attribute value to be a target virtual object; and
transmitting a service data of the determined target virtual object to the terminal to provide the terminal with a service data related to the target real object.

40. The method of claim 39, further comprising selecting a target real object through the terminal.

41. The method of claim 40, wherein the target real object comprises a real object of which a position is fixed, a real object of which a moving path according to time is regular, a real object to which a unique identification parameter storing identification information for identifying an object is attached, a real object comprising a text or a symbol, and a person having the object terminal.

42. The method of claim 39, further comprising: establishing a new virtual object to store in the object identification system, when a virtual object having an attribute value matched to an attribute value of the target real object is not existed.

43. The method of claim 42, wherein establishing the new virtual object to store in the object identification system comprises determining whether a virtual object is established through the terminal or not.

44. The method of claim 42, wherein establishing the new virtual object to store in the object identification system comprises inputting a service data related to the established virtual object through the terminal and storing the inputted service data to the object identification system.

45. The method of claim 39, when the number of a virtual object having an attribute value matching with an attribute value of the target real object is no less than two, further comprising determining a virtual object selected by the terminal as a target virtual object.

46. The method of claim 39, wherein the virtual object comprises a main virtual object and at least one sub-virtual object, and the main virtual object and the sub-virtual object respectively correspond to the same real object to have attribute values different from each other or service data different from each other.

47. The method of claim 46, further comprising: establishing a sub-virtual object which corresponds to the target real object to comprise at least one an attribute value of the determined target virtual object, an attribute different from a service data and a service data.

48. The method of claim 47, further comprising: inputting a service data related to the sub-virtual object established through the terminal.

49. The method of claim 39, wherein the attribute value of the virtual object comprises a relation object sharing the service data, wherein providing the terminal with a service data related to the target real object comprises transmitting a service data shared with the target virtual object of a service data of a relation object included in an attribute value of the target virtual object.

50. The method of claim 39, wherein providing the terminal with a service data related to the target real object comprises displaying information service data related to the target virtual object on the terminal.

51. The method of claim 39, further comprising: inputting information service data related to the target virtual object to transmit the inputted information service data to the object identification system; and storing the transmitted information service data to a service data of the target virtual object.

52. The method of claim 39, further comprising: inputting memo/bulletin service data related to the target real object to transmit the inputted memo/bulletin service data to the object identification system; and storing the transmitted memo/bulletin service data to a service data of the target virtual object.

53. The method of claim 52, further comprising: limiting a public condition of the memo/bulletin service data which comprises at least one of time to read the memo/bulletin service data, weather, a range of a receiver and a range of public contents.

54. The method of claim 39, wherein providing the terminal with a service data related to the target real object comprises displaying memo/bulletin service data related to the target virtual object on the terminal.

55. The method of claim 39, further comprising: transmitting text message/E-mail service data comprising a text message or an electric mail for delivering the target real object to the object identification system and storing the text message/E-mail service data in a service data of the target virtual object.

56. The method of claim 39, wherein providing the terminal with a service data related to the target real object comprises: transmitting a text message or E-mail message included in the target virtual object to the terminal.

57. The method of claim 39, wherein providing the terminal with a service data related to the target real object comprises: transmitting a Uniform Resource Locator (URL) of a Website related to the target real object to the terminal to display the Website related to the target real object on the terminal.

58. The method of claim 39, further comprising: inputting a URL of a Website related to the target virtual object through the terminal to transmit the inputted URL to the object identification system; and storing the transmitted URL to a service data of the target virtual object.

59. The method of claim 39, further comprising: transmitting an attaching file to be attached to the target real object to the object identification system through the terminal; and storing the attaching file transmitted from the terminal in a service data of the target virtual object.

60. The method of claim 39, wherein providing the terminal with a service data related to the target real object comprises: transmitting an attaching file included in the target virtual object to the terminal.

61. The method of claim 39, wherein providing the terminal with a service data related to the target real object comprises: providing the terminal with at least one of a list of terminals accessed to the target real object and a list of terminals recently accessed to the target real object.

62. The method of claim 39, wherein previewing the target real object comprises: previewing a target real object having a fixed position value; and determining the target virtual object comprises: determining a virtual object having a position value matched to a position value of the target real object of the virtual objects as an attribute value to be the target virtual object.

63. The method of claim 62, wherein generating the real object identification data comprises: generating a position value of the terminal, a distance value between the target real object and the terminal, and an azimuth value of the target real object for measuring a direction viewing the target real object through the terminal, wherein determining the target virtual object further comprises: computing a position value of the target real object from the position value of the terminal, the distance value between the target real object and the terminal and the azimuth value of the target real object.

64. The method of claim 39, wherein previewing the target real object comprises previewing a target real object moved in a regular moving path to have a regular position value according to a time, wherein determining the target virtual object comprises: determining a virtual object having a position value matched to a position value of the target real object at a time when the target real object is previewed as an attribute value to be the target virtual object.

65. The method of claim 64, wherein generating the real object identification data comprises: generating a position value of the terminal, a distance value between the target real object and the terminal, and an azimuth value of the target real object for measuring a direction viewing the target real object through the terminal, wherein determining the target virtual object further comprises: computing a position value of the target real object corresponding to a time previewed by the target real object from the position value of the terminal, the distance value between the target real object and the terminal and the azimuth value of the target real object.

66. The method of claim 39, wherein previewing the target real object comprises previewing a target real object moved in a regular moving path to have a regular position value according to a time, wherein generating the real object identification data comprises generating a variation value according to a time of a position value of the terminal, and wherein generating the target virtual object comprises: computing a position value according to a moving path of the target real object and a time from the variation value; and determining a virtual object having a position value according to a moving path and a time matched to the computed position value according to the computed moving path and the computed time of the virtual objects as an attribute value to be a target virtual object.

67. The method of claim 39, wherein previewing the target real object comprises: previewing celestial bodies, wherein determining the target virtual object further comprises: determining a virtual object having a position value on a celestial sphere matched to a position value on a celestial sphere of the celestial bodies at a date and a time when the celestial bodies are previewed of virtual objects as an attribute value to be a target virtual object.

68. The method of claim 67, wherein generating the real object identification data comprises: generating a position value of the terminal, an azimuth value of the target real object and a height value of the celestial bodies, wherein generating the target virtual object further comprises: computing a position value on a celestial sphere of the celestial bodies at a date and a time when the celestial bodies are previewed from the position value of the terminal, the azimuth value of the target real object and the height value of the celestial bodies.

69. The method of claim 68, further comprising: measuring a height of the terminal, wherein computing the position value on the celestial sphere of the celestial bodies comprises: computing a position value on a previewed celestial sphere of the celestial bodies from the position value of the terminal, the azimuth value of the celestial bodies and the measured height value of the terminal.

70. The method of claim 39, wherein previewing the target real object comprises: previewing an object to which a unique identification parameter storing identification information for identifying an object is attached, wherein generating the real object identification data comprises: sensing the identification information of the target real object stored at the unique identification parameter, and wherein determining the target virtual object comprises: determining a virtual object having identification information matched to identification information of the target real object transmitted from the terminal of the virtual objects as an attribute value to be a target virtual object.

71. The method of claim 70, wherein generating the real object identification data further comprises: generating a position value of the terminal, wherein determining the target virtual object comprises: determining a virtual object having identification information and a position value that are respectively matched to identification information of the target real object and a position value of the terminal that are transmitted from the terminal of the virtual objects as an attribute value to be a target virtual object.

72. The method of claim 39, wherein previewing the target real object comprises: previewing a text or a symbol, wherein generating the real object identification data comprises: converting the text or the symbol into text data or image data, respectively, and wherein determining the target virtual object comprises: determining a virtual object having text data or image data that is respectively matched to text data or image data of the target real object transmitted from the terminal of the virtual objects as an attribute value to be a target virtual object.

73. The method of claim 72, further comprising: generating a position value of the terminal of the terminal, wherein determining the target virtual object comprises: determining a virtual object having image data and a position value that are respectively matched to image data and position value of the target real object transmitted from the terminal of the virtual objects as an attribute value to be a target virtual object.

74. The method of claim 39, wherein previewing the target real object comprises: previewing a person having a target object terminal, wherein determining the target virtual object comprises: computing a position value of the target object terminal at a time when the target object terminal is previewed, and determining a virtual object having a position value matched to a position value of the target object terminal at a time when the target object terminal is previewed of virtual objects as an attribute value to be a target virtual object.

75. The method of claim 74, wherein generating the real object identification data comprises: generating a position value of a user terminal, a distance value between the user terminal and the target object terminal and an azimuth value of the target object terminal, and wherein determining the target virtual object further comprises: computing a position value of the target object terminal at a time when the target object terminal is previewed from the position value of the user terminal, the distance value between the user terminal and the target object terminal and the azimuth value of the target object terminal.

76. The method of claim 75, wherein the user terminal and the target object terminal use Bluetooth, the target object terminal included in at least one slave terminal, wherein generating the real object identification data comprises:
  receiving a slave terminal data set comprising terminal identification information and a position value of the slave terminal from the slave terminal,
  transmitting a real object identification data generated by the terminal to the object identification system
  transmitting the slave terminal data set to the object identification system, and
  determining the target virtual object comprises: comparing the computed position value of the target object terminal with a position value of the at least one slave terminal included in the slave terminal data set to obtain a slave terminal having a position value matched to the computed position value of the target object terminal, and determining a virtual object having a terminal identification information matched to a terminal identification information included in a slave terminal data set of the obtained slave terminal as an attribute value to be a target virtual object.

77. The method of claim 39, wherein generating the real object identification data comprises establishing a distance value between the target real object and the terminal through the terminal.

* * * * *